US006622214B1

(12) United States Patent
Vogt et al.

(10) Patent No.: US 6,622,214 B1
(45) Date of Patent: Sep. 16, 2003

(54) SYSTEM AND METHOD FOR MAINTAINING MEMORY COHERENCY IN A COMPUTER SYSTEM HAVING MULTIPLE SYSTEM BUSES

(75) Inventors: Pete D. Vogt, Boulder, CO (US); George P. White, Long Beach, CA (US); Stephen S. Chang, Glendora, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/228,665

(22) Filed: Jan. 12, 1999

Related U.S. Application Data

(62) Division of application No. 08/714,750, filed on Sep. 16, 1996, now Pat. No. 5,897,656.

(51) Int. Cl.⁷ ............................................. G06F 13/14
(52) U.S. Cl. ........................ 711/141; 711/124; 711/146
(58) Field of Search ........................ 711/141, 143–145, 711/133, 159, 146, 124, 154, 130, 210; 710/100, 107, 128, 54–55, 305, 309–310

(56) References Cited

U.S. PATENT DOCUMENTS

| | | | |
|---|---|---|---|
| 4,245,344 A | 1/1981 | Richter | 714/43 |
| 4,796,232 A | 1/1989 | House | 365/189.03 |
| 4,953,081 A | 8/1990 | Feal et al. | 710/111 |
| 4,982,321 A | 1/1991 | Pantry et al. | 710/107 |
| 5,115,411 A | 5/1992 | Kass et al. | 365/189.01 |
| 5,119,485 A | 6/1992 | Ledbetter, Jr. et al. | 711/146 |
| 5,193,163 A | 3/1993 | Sanders et al. | 711/122 |
| 5,225,374 A | 7/1993 | Fare et al. | 438/1 |
| 5,265,211 A | 11/1993 | Amini et al. | 710/36 |
| 5,269,005 A | 12/1993 | Heil et al. | 710/49 |
| 5,293,603 A | 3/1994 | MacWilliams et al. | 710/129 |
| 5,319,766 A | 6/1994 | Thaller et al. | 711/146 |
| 5,325,510 A | 6/1994 | Frazier | 711/118 |
| 5,359,715 A | 10/1994 | Heil et al. | 710/128 |
| 5,369,748 A | 11/1994 | McFarland et al. | 710/126 |
| 5,369,753 A | 11/1994 | Tipley | 711/122 |
| 5,386,517 A | 1/1995 | Sheth et al. | 710/60 |
| 5,398,325 A | 3/1995 | Chang et al. | 711/3 |
| 5,404,462 A | 4/1995 | Datwyler et al. | 713/600 |
| 5,414,820 A | 5/1995 | McFarland et al. | 710/128 |
| 5,442,754 A | 8/1995 | Datwyler et al. | 710/128 |
| 5,495,570 A | 2/1996 | Heugel et al. | 714/11 |
| 5,495,585 A | 2/1996 | Datwyler et al. | 710/100 |
| 5,553,258 A | 9/1996 | Godiwala et al. | 711/3 |
| 5,553,263 A | 9/1996 | Kalish et al. | 711/127 |
| 5,644,753 A | 7/1997 | Ebrahim et al. | 711/131 |
| 5,673,400 A | 9/1997 | Kenny | 710/129 |
| 5,684,977 A * | 11/1997 | Van Loo et al. | 711/143 |

(List continued on next page.)

FOREIGN PATENT DOCUMENTS

DE 195 06 734 A1 9/1995
EP 0 507 063 A1 10/1992

OTHER PUBLICATIONS

Corollary Inc., Gemini External Design Specification, Dec. 4, 1995, pp. 1–107.*

(List continued on next page.)

Primary Examiner—Matthew Kim
Assistant Examiner—Denise Tran
(74) Attorney, Agent, or Firm—Blakely, Sokoloff, Taylor & Zafman LLP

(57) ABSTRACT

A cache-coherent, multiple-bus, multiprocessing system and method interconnects multiple system buses and an I/O bus to a shared main memory and efficiently maintains cache coherency while minimizing the impact to latency and total bandwidth within the system. The system provides coherency filters which coordinate bus-to-bus communications in such a way as to maintain cache memory coherency with a small amount of cross-bus traffic. In addition, the system provides a multiported pool of memory cells which interconnect the multiple buses.

9 Claims, 11 Drawing Sheets

U.S. PATENT DOCUMENTS

| | | | | | |
|---|---|---|---|---|---|
| 5,740,400 | A | * | 4/1998 | Bowles | 711/144 |
| 5,822,755 | A | * | 10/1998 | Shippy | 711/118 |
| 5,828,835 | A | | 10/1998 | Isfeld et al. | 709/200 |
| 5,829,033 | A | * | 10/1998 | Hagersten et al. | 711/141 |
| 5,857,084 | A | | 1/1999 | Klein | 710/129 |
| 5,900,011 | A | * | 5/1999 | Saulsbury et al. | 711/119 |

OTHER PUBLICATIONS

"VIC 8251F VIC to VME Interface with Mirrored Memory," Creative Electronic Systems, Version 1.1, Jun. 1994, pp. 1–103, XP002198526, Petit–Lancy, Switzerland.

"IBM patents—Abstract/Exempt Claim", U.S. patent No. 5,018,053 issued May 21, 1991, patent title "Method for Reducing Cross–Interrogate Delays in a Multiprocessor System", *Micron Technology Confidential Information,* p. 2658, Mar. 27, 1996.

Customer Request Summary—E014 Full–Text Patent Report, U.S. Patent No. 5,369,753, issued Nov. 29, 1994, patent title "Method and Apparatus for Achieving Multilevel Inclusion in Multilevel Cache Hierarchies", *SPO Services Results,* 18 pages, Mar. 13, 1996.

Anderson, Don, et al., "Chapter 4: Multiple Processors and the MESI Model", *Pentium™ Processor System Architecture,* pp. 65–91, 1995.

Glaskowsky, Peter N., "Profusion Adds Processors and Performance: Corollary Creates Credible Chip Set for 8–CPU Pentium Pro Servers", *Microdesign Resources,* 2 pages, Sep. 16, 1996.

"ULTRASPARC™—Ultra Port Architecture (UPA): The New–Media System Architecture", from Sun Microelectronics, 4 pages, last updated Jun. 6, 1996.

"Gemini External Design Specification", *Corollary Confidential Document,* pp. i–107, Dec. 4, 1995.

"Gemini Reference Platform Specification", *Corollary Confidential Document,* pp. i–29, Mar. 15, 1996.

Handy, Jim, "Chapter 4: Maintaining Coherency in Cached Systems", *The Cache Memory Book,* pp. 125–190, 1993.

* cited by examiner

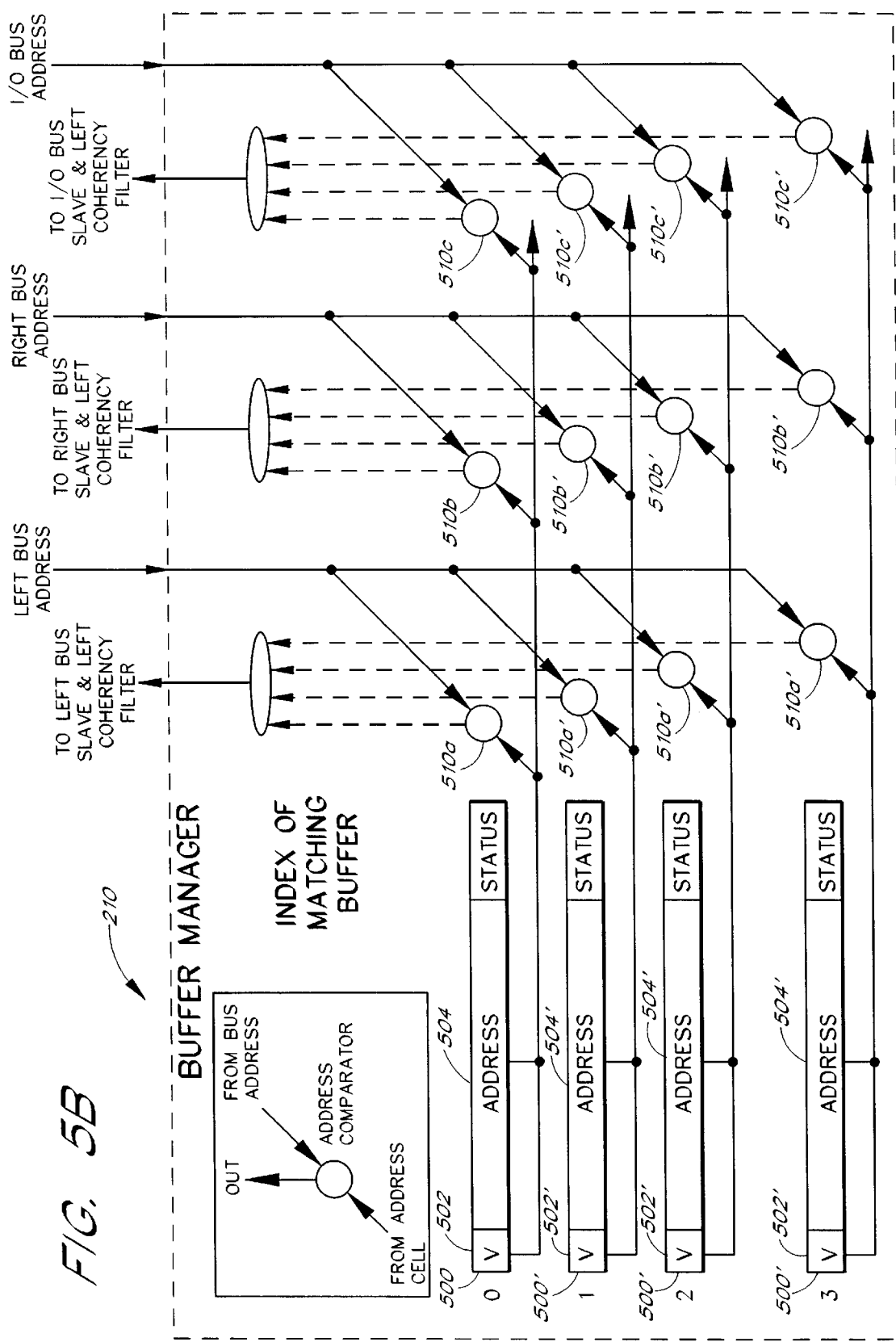

SYSTEM AND METHOD FOR MAINTAINING MEMORY COHERENCY IN A COMPUTER SYSTEM HAVING MULTIPLE SYSTEM BUSES

This U.S. Patent application is a divisional application of U.S. patent application Ser. No. 08/714,750, filed Sep. 16, 1996, now U.S. Pat. No. 5,897,656.

BACKGROUND OF THE INVENTION

In order to improve the performance of computers having a single central processing unit, computer designers have developed computers which have many central processing units. Often, the central processing units in such multiprocessing computers are connected to each other and to the system's main memory over a single common bus. Recently, however, central processing unit performance is improving at a faster rate than bus performance technology. Faster internal central processor performance results in the need for more external bandwidth. That is, the amount of data transmitted on a common bus must increase to support increased central processing performance. Consequently, the number of central processors which can be connected to a common bus is limited by the bandwidth needed to support the central processors and the total bandwidth of the common bus.

One approach for reducing the bus bandwidth required by each processor in a multiprocessing system has been to place a cache unit between each processor and the common bus. Once data is loaded into a processor's associated cache unit, the processor can access the data in the cache unit without using the common bus. Typically, when a processor obtains data from its cache unit, less data is transmitted over the limited bandwidth of the common bus.

In many cases, a processor will modify a particular data value many times which, in turn, necessitates rewriting the data value back to main memory each time the data value is modified. Rewriting modified data values back to main memory, however, increases the amount of bus bandwidth needed to support a processor. Therefore, if the number of write operations can be reduced, the bus bandwidth required to support a processor can be reduced.

One type of cache unit which reduces the number of write operations is called a "write-back" cache. A write-back cache temporarily stores the modified data values and thus reduces the number of bus transactions needed to write the data values back to main memory. For example, a processor may modify a data value many times in the write-back cache without writing the data back to main memory. The write-back cache ensures that the modified data is eventually written back to main memory.

While write-back caches can be very efficient at reducing the total bus bandwidth required by a multiprocessing system, write-back caches unfortunately create memory coherency problems. For example, each write-back cache contains its own copy of a data value. In such situations, if more than one processor can independently modify a data value, then different versions of the same data value could exist in more than one write-back cache. This would result in erroneous operations, consequently, some mechanism must ensure that all the processors have a consistent view of all data values at all times.

For example, when a processor modifies a data value, the modified data value exists in the write-back cache before it is written back to main memory. In this example, until the write-back cache writes the modified data value back to main memory, the main memory and the other cache units will contain a stale copy of the data value. In order to maintain data integrity, however, the other processors which request the data value must obtain the up-to-date version of the data value, not the stale data value.

The process of ensuring that all the processors have a consistent view of all data values is called cache coherency. One popular and successful set of methods for achieving cache coherency relies on what are called "snooping operations." While a wide variety of snooping operations exist, basically, the snooping operations in a cache unit monitor the bus transactions on the common bus. The snooping operations identify which transactions affect the contents of a cache unit or which transactions relate to modified data existing in a cache unit. Snooping operations typically require that all the processors and their associated cache units share a common bus. Sharing a common bus allows the cache units to monitor the bus transactions and potentially interfere with a bus transaction when a particular cache unit contains a modified data value.

Cache coherency methods also typically utilize coherency status information which indicates whether a particular data value in a cache unit is invalid, modified, shared, exclusively owned, etc. While many cache coherency methods exist, two popular versions include the MESI cache coherency protocol and the MOESI cache coherency protocol. The MESI acronym stands for the Modified, Exclusive, Shared and Invalid states while the MOESI acronym stands for the Modified, Owned, Exclusive, Shared and Invalid states.

The meanings of the states vary from one implementation to another. Broadly speaking, the modified state usually means that a particular cache unit has modified a particular data value. The exclusive state and owned state usually means that a particular cache unit may modify a copy of the data value. The shared state usually means that copies of a data value may exist in different cache units, while the invalid state means that the data value in a cache unit is invalid.

In operation, the cache units snoop the bus operations and use the coherency status information to ensure cache coherency. For example, assume that a first processor having a first cache unit desires to obtain a particular data value. Furthermore, assume that a second processor having a second cache unit contains a modified version of the data value (the coherency status information indicates that the data value in the second cache unit is in the modified state).

In this example, the first processor initiates a read bus request to obtain the data value. The second cache unit snoops the read bus request and determines that it contains the modified version of the data value. The second cache unit then intervenes and delivers the modified data value to the first processor via the common bus. Depending on the system, the modified data value may or may not be simultaneously written to the main memory.

In another example, assume that the first processor desires to exclusively own a particular data value. Furthermore, assume that a second cache unit contains an unmodified, shared copy of the data value (the coherency status information indicates that the data value in the second cache unit is in the shared state). In this example, the first processor initiates a read bus request which requests data for exclusive use.

The second cache unit snoops the read bus request and determines that it contains a shared copy of the data value. The second cache unit then invalidates its shared data value by changing the data value's coherency status information to the invalid state. Changing the data value's coherency status to the invalid state invalidates the data value within the second cache unit. The first processor then completes the read bus request and obtains a copy of the data value from main memory for exclusive use.

While snooping operations maintain cache coherency on multiprocessing systems with a single common bus, more powerful computers contain more than one bus such that each bus interconnects main memory with multiple processors; however, because a common bus has a growing limitation in the number of processors it can support, a multiple-bus system might be necessary to achieve a desired level of performance. A problem associated with multiple buses is that the processors on one bus cannot monitor the transactions initiated by the processors on the other buses. Consequently, the snooping operations cannot maintain memory coherency in multiple-bus computers.

One way to maintain cache coherency in multiple-bus systems is to broadcast the bus transactions initiated on each bus to all the other buses. Unfortunately, this approach results in having the combined bus bandwidth load of all buses transmitted to each bus. As can be expected, this can significantly reduce system performance and obviate the benefit of multiple buses.

A second approach is based on what are called directory-based cache coherency methods. The IEEE Scaleable Coherent Interconnect is an example of a multiple-bus, directory-based cache coherency system. In directory schemes, the processors do not snoop the bus transactions. Rather, the main memory subsystem maintains memory coherency by storing extra information with the actual data.

The extra information in the main memory subsystem typically indicates 1) which processor or processors have obtained a copy of a data value and 2) the coherency status of the data values. For example, the extra information may indicate that more than one processor shares the same data value. In yet another example, the extra information may indicate that only a single processor has the right to modify a particular data value.

When a processor requests a data value, the main memory subsystem determines whether it has an up-to-date version of the data value. If not, the main memory subsystem transfers the up-to-date data value from the processor with the up-to-date data value to the requesting processor. Alternatively, the main memory can indicate to the requesting processor which other processor has the up-to-date data value.

Because the information regarding the location of the up-to-date version of each data value is kept by the main memory subsystem, the processors do not need to "snoop" the bus transactions. Keeping such a directory, however, can add significant cost to a system due to the additional information that must be held for each data value in main memory. In addition, maintaining a directory for each data value in main memory can also degrade system performance due to the time needed to locate and transfer the required data to a requesting processor.

An alternative to directory-based systems would be a bus interconnect which stores the coherency status information associated with the data values which are actually stored in the cache units. Thus, rather than storage which increases proportionally as the main memory increases (as in directory-based schemes), the amount of storage is only related to the much smaller size of the combined cache units. This approach, however, requires the multiple-bus system to store a duplicate copy of the coherency status information associated with all the data values in each of the cache units.

For example, Sun Microsystem's UltraSparc system uses a bus switch to interconnect multiple buses wherein each bus is in communication with processors having internal cache units. The bus switch maintains a duplicate copy of the coherence status information associated with all the data values in the cache units. In the UltraSparc system, the bus switch is capable of maintaining a duplicate copy of the coherency status information because the processors in the UltraSparc system are configured to provide accurate information as to which data value is being replaced allowing an external cache tag can be maintained.

Such a bus switch, however, is not feasible with many off-the-shelf processors because they do not output accurate cache data replacement information. For example, many conventional processors keep accurate coherency status information only within their internal cache units. Thus, other devices cannot determine when a data value is removed from an internal cache unit. Without accurate information about the coherency status information in the internal cache units, a bus switch cannot maintain a duplicate copy of the coherency status information.

SUMMARY OF THE INVENTION

The present invention provides a cache-coherent, multiple-bus system which effectively increases the total processor performance limitations of single-bus systems. The present invention recognizes that multiple-bus, multi-processing systems need a low latency, high-bandwidth system which 1) interconnects multiple system buses and multiple I/O devices to a shared main memory and 2) efficiently maintains cache coherency while minimizing the impact to latency and total bandwidth within the system. The subject invention addresses these problems with "coherency filters" which allow the coordination of bus-to-bus communications in such a way as to maintain cache memory coherency while reducing the overhead in cross-bus traffic.

In a preferred embodiment of the present invention, the system buses, I/O buses and memory units are coupled via a multiported bus switch. This bus switch not only connects any system bus or I/O bus to any memory unit, but also handles cross-bus traffic. In addition, the preferred bus switch contains bus interface logic which determines the operation or operations needed to respond to bus transactions. The present invention, however, is not limited to such a multiported bus switch and can be utilized in a wide variety of other bus interconnects, such as when separate bus bridges exist for different data paths.

To ensure cache coherency in a multiple-bus, multiprocessing system, each bus which supports caches has an assigned coherency filter. Each coherency filter contains a tag controller, a cycle encoder and a rules table. In addition, each coherency filter is coupled to a tag memory. Generally speaking, each tag controller interfaces with all of the tag memories. Each cycle encoder determines what kind of bus transaction is occurring on the cycle encoder's assigned bus and each rules table determines what bus transaction or transactions are needed to maintain cache coherency.

Focusing now on the tag memories, each tag memory maintains a record of 1) the addresses of the data values which are located in the cache units connected to the tag memory's assigned bus, and 2) the cache coherency status associated with the data values. As is well known, each data value in main memory is identified with a corresponding memory address. In the preferred embodiment, the tag memories store the data value addresses which identify data values, not the actual data values. In addition to storing the data value addresses, the preferred tag memories also store the coherency status information associated with the data value addresses.

For instance, assume that a first coherency filter and a first tag memory is assigned to a first bus. Further assume that a first processor on the first bus requests a data value from the main memory. The first coherency filter maintains a record of the memory address in the first tag memory. In addition, the first coherency filter also stores the coherency status information associated with the memory address in the first tag memory.

The amount of data accessed in a memory transaction varies from system to system. In most conventional systems, when a processor performs a memory read transaction, the processor accesses enough memory to fill a portion of the processor's internal cache memory. Typically, an internal cache memory stores multiple data values in what is called a cache line.

As is well known, memory in a conventional computer processing system is divided into 8-bit quantities (bytes), 16-bit quantities (words) and 32-bit quantities (double words). In many current 32-bit processors, main memory is organized into double word (32-bit) boundaries. In most 32-bit processors each cache line can hold multiple double words.

In general, when a processor requests a data value, the processor obtains enough data to fill an entire cache line. For example, in the Pentium® Pro processor available from Intel Corporation, each internal data value varies in size, but is no larger than 64 bits. The Pentium® Pro's cache line, however, holds 32 bytes of data (256 bits). When a Pentium® Pro processor desires to obtain a data value from main memory, it typically obtains eight data values (256 bits) needed to fill one of its cache lines.

In conventional systems, each cache line is identified by a cache line address. For example, in a Pentium® Pro system, a cache line will have the same cache line address as the memory address of the lowest-order data value in the cache line. However, because each cache line contains 32 bytes of data, the cache line address of each cache line is shorter and does not include the five lowest-order address bits. In the preferred embodiment, each tag memory assigned to a particular bus stores the cache line addresses.

In addition to storing the cache line addresses, each tag memory also stores the coherency status associated with the cache line addresses. The coherency status relates to the status of the cache line in the cache units. In the preferred embodiment, the coherency status contains three different coherency states—an invalid state, a shared state or an owned state.

The invalid state means that the cache line is invalid and that the cache entry which stores the cache line is empty and can store a new cache line. The shared state means that a processor has a copy of the cache line but does not have modification rights. Shared cache lines, for example, are often program instructions which are not modified, or read-mostly data items. The owned state means that the cache line may be modified by a processor which has obtained the cache line.

A person of ordinary skill in the art, however, will appreciate that the coherency status of a cache line is not limited to the invalid, shared and owned protocol. Indeed, a person of skill in the art will recognize that the coherency status could be implemented with a wide range of coherency protocols such as the Modified, Exclusive, Shared and Invalid (MESI) protocol, the Modified, Owned, Exclusive, Shared and Invalid (MOESI) protocol, the Modified, Shared, Invalid (MSI) protocol, a two state Invalid and Owned protocol, the Berkeley protocol, the University of Illinois coherency protocol, Digital Equipment's Firefly protocol, the Xerox Dragon protocol and the like. The preferred embodiment utilizes the Invalid, Shared and Owned because of its ability to efficiently interface with Pentium Pro processors which utilize the MESI protocol.

In many conventional processors, the processors have internal cache units which do not output accurate coherency status information about the cache lines stored within the internal cache units. For example, an internal cache unit may discard an unmodified cache line without signaling that the cache line has been discarded. In another example, an internal cache unit may obtain a cache line with modification privileges which the cache unit does not modify. In this example, the cache unit may discard the cache line without signaling that the cache line has been discarded. Consequently, devices which monitor the cache unit may believe that the cache unit has a modified copy of the cache line when the cache line has in fact discarded the cache line. In the preferred embodiment of the present invention, however, each tag memory is uniquely adapted to ensure cache coherency for internal cache units which do not output current coherency status information.

An important aspect of the present invention is that each tag memory ensures cache coherency by maintaining a superset of the cache line addresses which might possibly be currently held in the internal cache units. Thus, the superset of cache line addresses in a tag memory may indicate that a particular cache line in a cache unit is in the shared state when the cache unit has, in fact, discarded the cache line. In other cases, the superset of cache line addresses in a tag memory may indicate that a particular cache line in a cache unit is in the modified state, when the cache unit has, in fact, written the cache line back to main memory.

In order to maintain a superset of the cache line addresses, the preferred coherency filters use what is called the inclusion rule. The inclusion rule ensures that the cache line addresses stored in the cache units connected to a particular bus are always a subset of the cache line addresses in the tag memory assigned to that bus. Because each coherency filter monitors all the cache lines accessed by its associated bus, the address associated with each accessed cache line is maintained in the tag memory assigned to the bus. When a cache line address must be deleted from one of the tag memories, the inclusion rule directs the associated cache units to delete the cache line from their cache memories.

For example, when a tag memory does not have the memory capacity to hold a new cache line address, room must be made in the tag memory for the new cache line address by expelling one of the existing cache line addresses (the old cache line address) from the tag memory. If the old cache line address is in the invalid state (the cache units connected to the bus no longer are using the cache line associated with the old cache address), the coherency filter assigned to the tag memory simply replaces the old cache line address with the new cache line address.

However, when the old cache line address is in the shared or owned state, the coherency filter cannot expel the old cache line address from the tag memory until the cache units invalidate the old cache line address. As explained above, the preferred tag memories maintain a superset of the cache line addresses, thus the old cache line address must first be invalidated in the cache units before the old cache line address can be replaced with the new cache line address.

The coherency filters invalidate the old cache line address in the cache units by performing an invalidation bus transaction. The invalidation bus transaction directs the cache units connected to the bus to internally invalidate the old cache line address and its associated cache line.

For instance, assume that a first processor with a first cache unit and a second processor with a second cache unit is connected to a first bus which has an assigned coherency filter and a tag memory. Furthermore, assume that the first cache unit contains a first cache line in the shared state. In this example, the tag memory contains the first cache line address and the shared status information. In addition, assume that a second processor initiates a read bus transaction which requests a second cache line. Finally, assume that the tag memory does't have the memory capacity for the second cache line address.

In this example, the coherency filter needs to expel the first cache line address to make room for the second cache line address. However, before the coherency filter can expel the first cache line address, the coherency filter must perform a bus transaction which invalidates the first cache line address in the first cache unit. To invalidate the first cache address line, the coherency filter performs an invalidation bus transaction which directs the first cache unit to invalidate the cache line associated with the first cache line address.

While performing the invalidation bus transaction, the coherency filter suspends the read bus transaction for the second cache line address. Because the first cache line address is in the shared state (the first cache line has not been modified) the first cache unit responds to the invalidation bus transaction and invalidates the first cache line. After completion of the invalidation bus transaction, the coherency filter replaces the first cache line address in the tag memory with the second cache line address.

In some cases, however, the first cache unit may have modified the first cache line (i.e., the first cache line is in the owned state). If the first cache line is in the owned state, the first coherency filter again performs the invalidation bus transaction which invalidates the first cache line. However, if the first cache unit has modified the first cache line, the first cache unit responds to the invalidation bus transaction by performing a write bus transaction which writes the modified first cache line back to main memory.

After writing the modified first cache line back to main memory, the first cache unit invalidates the first cache line. The coherency filter then replaces the first cache line address in the tag memory with the second cache line address. Thus, in some cases, maintaining a superset of the cache line addresses in the tag memory requires the cache units to write modified data back to the main memory before invalidating a cache line in the tag memory.

In the preferred embodiment, each coherency filter stores the cache line addresses in the tag memories using direct mapping techniques. Direct mapping techniques specify that each cache line address is mapped to a specific tag entry in a tag memory. While the preferred embodiment uses direct mapping techniques, one of ordinary skill in the art will recognize that a number of different techniques can be used to organize the cache line addresses within the tag memories. For instance, instead of direct mapping techniques, the tag memories may use fully associative mapping techniques. In a fully associative system, any cache line address can exist in any tag entry. In other embodiments, each cache line address can be stored in only one of two different tag entries (two-way set associative), or one of four different tag entries (four-way set associative), etc.

Focusing now on the direct mapping techniques of the preferred embodiment, each cache line address is used as an index to identify a particular tag entry. In the preferred embodiment, the number of entries in a tag memory defines the size of what is called a tag page. Preferably, the tag memories coupled to each system bus have the same tag page size. The tag page size is related to the amount of total cache memory in the caches of the processors. Furthermore, the tag memory coupled to the I/O bus is smaller in size because of the small cache units which are typically coupled to the I/O bridges.

A tag page should not be confused with a page of main memory. As is well known in the art, the physical memory address space of the computer can be conceptionally organized into multiple sections called memory pages wherein each memory page contains multiple cache lines. A memory page is defined by the processing system and is independent of the tag page.

In the preferred embodiment, the cache line address identifies 1) the tag page which contains the cache line address and 2) the location of the cache line address within the tag page. In particular, the high-order bits in the cache line address identify the tag page while the lower-order bits identify the location of the cache line address within the tag page.

Typically, the low-order bits are called indexes because the low-order bits identify the location of a cache line address within a tag page. For example, for the first cache line address in the first tag page, the high-order address bits identify the first tag page and the low-order address bits identify the first cache line address location within the first tag page.

In the preferred embodiment, the tag controller in a coherency filter direct maps the cache line addresses into a tag memory. For example, when a processor connected to a first bus initiates a bus transaction requesting a particular cache line address, the first tag controller evaluates the cache line address. The first tag controller uses the lower address bits as an index to identify a particular tag entry in the first tag memory. The first tag controller then stores the high-order bits (the tag page) in the identified tag entry.

In the preferred embodiment, the tag memories are implemented with static memory. The static memory implementation allows each tag controller to access each tag memory quickly during a bus transaction. While the present invention is implemented in static memory, a person of ordinary skill in the art, however, will recognize that different types of storage mechanisms may be used to implement the tag memories. Preferably, the different types of storage mechanisms will provide memory access speeds commensurate with the bus clock rates so as to optimize performance.

When two cache line addresses map to the same tag entry, the tag controller expels the previous cache line address to make room for the new cache line address. As explained above, this process can suspend the bus transaction associated with the new cache line address until the old cache line address has been invalidated. Furthermore, invalidating the old cache line address can require additional bus transactions to ensure that the tag memory maintains a superset of the cache line addresses existing in the cache units.

In one embodiment of the present invention, each coherency filter further contains an invalidation queue which holds the old cache line address and the new cache line address without suspending the bus transaction associated with the new cache line address. This can improve system performance because the invalidation bus transactions which invalidate the old cache line can occur at a later time.

Focusing now on maintaining cache coherency in multiple buses, the preferred coherency filters determine when a cross-bus transaction is required by monitoring the bus transactions on their assigned buses. In particular, the cycle encoders in each coherency filter monitors each bus transaction occurring on the coherency filter's assigned bus. In the preferred embodiment, the cycle encoder uses well known bus monitoring logic which monitors the bus control lines. The cycle encoder then transmits 1) the type of bus transaction and 2) the cache status information in the tag memories which is associated with the bus transaction to the coherency rules table.

Focusing now on the rules table, the rules table determines when to perform cross-bus transactions to ensure cache coherency. In the preferred embodiment, the rules table determines whether to perform a cross-bus transaction based in part on the coherency status information in the tag memories. For example, if a bus read transaction on a first bus identifies a particular cache line address, the rules table assigned to the first bus evaluates the coherency status of the cache line address in tag memories (the remote tag memories) assigned to the other buses.

With the coherency status information from the remote tag memories, the rules table determines whether a remote bus transaction is necessary to ensure cache coherency. As discussed in more detail below, in a particular coherency filter, the tag controller accesses the remote tag memories and inputs the cache status into the rules table. In addition, the cycle encoder determines the type of bus transaction and inputs the bus transaction information into the rules table.

In the preferred embodiment, the rules table acts as a large truth table. Using the bus transaction information and the remote tag memory information, the rules table determines which cross-bus transaction or set of bus transactions are needed to maintain cache coherency.

For example, assume a processor initiates a read bus transaction on a first bus. In this example, the first bus which initiates the bus transaction is referred to as the local bus while the other buses in the multiple bus system are called the remote buses. The read bus transaction transmits the desired cache line address to the coherency filter assigned to the local bus (the local coherency filter). The local coherency filter then evaluates whether the cache line address exists in the tag memories assigned to the remote buses (the remote tag memories).

The remote tag memories in this example indicate that the coherency status of the desired cache line address is the invalid state. In such a situation, there is no need to perform a cross-bus transaction to maintain cache coherency because the cache line address in the remote buses is invalid. Therefore, the local coherency rules table limits the bus transaction to the local bus and the main memory, without generating bus transactions on the remote bus. Limiting the bus transaction to the local bus reduces cross-bus traffic.

If, however, the remote tag memories indicate that a cross-bus transaction is required, the rules table determines the appropriate cross-bus transaction or set of transactions needed to ensure cache coherency. For example, one of the remote tag memories may indicate that the cache line address is the owned state and thus, a cache unit connected to the remote bus might possibly have a modified version of the cache line. If the remote tag memories indicate that the cache line address is in the owned state, the local rules table indicates that bus master logic connected to the remote bus needs to perform a bus read command on the remote bus to ensure cache coherency.

When the bus read command executes on the remote bus, the remote cache units snoop the bus read command and determine whether they have a modified version of the desired cache line. If one of the remote cache units on the remote bus returns a modified version of the cache line, the rules table forwards the cache line to the requesting processor on the local bus.

However, if none of the cache units on the remote bus have modified the cache line, the cache units do not respond to the bus read command. The rules table then determines that the up-to-date cache line is in main memory. Accordingly, the present invention transmits the up-to-date cache line in main memory to the requesting processor on the local bus. Thus, the preferred embodiment of the present invention uses the superset of cache line addresses in the tag memories to determine when cross-bus transactions are needed to maintain cache coherency.

An additional aspect of the present invention includes a third bus which is dedicated to interfacing with input/output devices. In the preferred embodiment, this third bus is called the input/output (I/O) bus. The preferred I/O bus is the same type of bus as the other processor buses; however, one of ordinary skill in the art will recognize that the I/O bus and each of the other processor buses may use different bus protocols.

The preferred I/O bus operates in a similar manner as the other processor buses. Most I/O transfers in high-performance computers is done with direct memory access (DMA) transfers. The DMA transfers are usually initiated by I/O devices which move data directly between main memory and the I/O device without direct central processor involvement. Maintaining memory coherency on the I/O transactions which occur on the I/O bus avoid the flushing of cache lines in the cache units before and after each DMA transfer.

Another type of I/O transfer involves direct programmed access of I/O data by the processors. In the preferred implementation, the bus switch forwards the direct I/O transfers to the I/O bus and forwards all memory accesses, other than accesses to the main memory address space, to the I/O bus as memory-mapped I/O transfers. Such I/O transfers do not involve cache coherency, but, as discussed in more detail below are transmitted from one bus to the other bus in a unique manner.

The preferred I/O bus contains an I/O coherency filter and an I/O bus interface which improves I/O mapping across multiple system buses and improves I/O data processing and reduces system bus complexity. I/O data transactions which occur on the buses are automatically forwarded to the I/O bus. In addition, transactions which originate on the I/O bus are sent to the destination bus without broadcasting the bus transactions to the other buses.

A further aspect of the present invention optimizes communications between multiple buses. Conventional bus switches, for example, interconnect different buses with independent connection paths. Thus, in a conventional multiple-bus system, the first bus and second bus are usually interconnected with one independent connection path, the first bus and third bus are interconnected with another independent connection path while the second bus and third bus are interconnected with yet another independent connection path. As can be expected, such independent connection paths increase bus switch implementation complexity.

For example, when a first bus desires to direct a first bus transaction to a second bus, the first bus places the first bus transaction in a first queue which links the first bus with the second bus. The second bus then obtains the first bus transaction from the output of the first queue. Likewise when the second bus desires to direct a second bus transaction to the first bus, the second bus places the second bus transaction in a second queue which links the second bus with the first bus. The first bus then obtains the second bus transaction from the output of the second queue.

Therefore, two buses require two queues. When additional buses are interconnected more queues are required. For example, in a three-bus system each bus-to-bus connection requires two queues. Consequently, a three-bus system requires six queues.

The unique approach to implementing a bus switch in the preferred embodiment, however, reduces such system complexity with a multiported pool of memory cells which are accessible by all of the buses. With the unique bus switch, data can flow from any bus to any other bus without interfering with other data transfers which may be occurring at the same time. As discussed in more detail below, the bus transfers from each of the buses enter the common pool of memory cells. The bus transactions in the common pool of memory are then directed to their destination buses. Advantageously, any bus can read from or write to any other bus without using independent connection paths.

In the preferred embodiment, the information associated with each bus transaction is stored in three different memory cells called the data cells, the request cells and the address cells. The data cells store the data associated with a bus transaction. The request cells contain bus transaction information which defines the type of bus transaction sent to the destination bus. Finally, the address cells contain address information and coherency status information related to a bus transaction.

In the preferred embodiment, a one-to-one correspondence exists between each data cell, each request cell and each address cell. Thus each data cell, request cell or address cell, or any combination of these cells can contain the information for a particular bus transaction. While the preferred embodiment uses three memory cells to hold bus transaction information, the bus transaction information could exist in less or more than three memory cells.

Conceptionally, the data cells, request cells and address cells can be viewed as existing in a single pool of multiported memory. Although, in the preferred embodiment, the data cells, request cells and address cells are located in different components, they continue to maintain their one-to-one correspondence. In the preferred embodiment, a data interface buffer contains the data cells while a system access controller contains the address cells and request cells.

Focusing now on the preferred data interface buffer, each of the data cells in the data interface buffer is multiported and accessible by all of the buses. Each data cell contains the data associated with a particular bus transaction. Advantageously, the pool of data cells in the data interface buffer interconnects the bus data paths.

Focusing now on the preferred system access controller, the system controller contains a central request list, a buffer manager, a plurality of bus masters and a plurality of bus slaves. As is well known in the art, each bus master initiates bus transactions on one of the buses while each bus slave receives bus transactions initiated by other devices connected to one of the buses. The central request list maintains the pool of request cells and the buffer manager maintains the pool of address cells.

Each of the request cells in the central request list is multiported and accessible by all of the buses. Each request cell contains a target bus identifier, an action code which is also called the bus transaction code, and an owner bus identifier. The target bus identifier identifies a particular destination bus, the bus transaction code identifies a particular bus transaction and the owner bus identifier identifies the originating bus.

Focusing now on the pool of address cells in the buffer manager, each address cell is multiported and contains "in-use" information, a memory address and data cell status information. The in-use information in an address cell indicates whether an address cell is available for use. In the preferred embodiment, the in-use information comprises an in-use bit which is set to indicate whether an address cell is in use or free. In some cases, when an in-use bit is set to free, valid data may exist in the data cells. This allows optimizations which reuse the valid data in the free data cells.

The memory address, on the other hand, contains the memory address associated with a bus transaction while the data cell status indicates the status of the data in the data cells. In addition to the pool of address cells, the buffer manager also includes an address cell priority encoder, multiple first-in-first-out (FIFO) memories and multiple address comparators. The address cell priority encoder determines which address cells are in use and which address cells are free to receive new bus transaction information. In the preferred embodiment, the address cell priority encoder determines which address cells are free by evaluating the in-use information in each address cell.

The address cell priority encoder not only determines which address cells are free, but also assigns the free address cells to the different buses. Preferably, the address cell priority encoder assigns the free address cells to the different buses. After assigning the free address cells to the buses, the address priority encoder sets the in-use bit to indicate that the address cell is not free. For example, assume in a three bus system, the priority encoder determines that three address cells are free. The preferred priority encoder assigns the first free address cell to the first bus, the second free address cell to the second bus and the third free address cell to the third bus.

When a fourth address cell becomes free, the address cell priority encoder cycles back to the first bus and assigns the fourth address cell to the first bus. While the preferred address cell priority encoder uses such techniques to assign the free address cells to different buses, one of ordinary skill in the art will appreciate that the address cell priority encoder can employ a wide range of allocation schemes to assign the free address cells to the different buses.

Focusing now on the FIFO memories in the buffer manger, the FIFO memories temporarily store the assigned address cells until they are needed by the buses. In the preferred embodiment, the FIFO memories store address cell identifiers which identify the assigned address cells. An address cell identifier is a data variable which contains the memory location of an assigned address cell. The buses use an address cell identifier to access the address cell memory location identified by the address cell identifier.

In the preferred embodiment, each FIFO memory is assigned to a particular bus. Furthermore, each FIFO memory is coupled to one of the bus slaves and one of the coherency filters assigned to the same bus as each FIFO memory. When one of the bus slaves or one of the coherency filters desires to send a bus transaction to another bus, they obtain one of the address cell identifiers from their assigned FIFO memory.

For example, assume that a first processor on a first bus desires to send a data value to a second I/O device on a second bus. In this example, a first bus slave is connected to the first bus. When the first processor initiates a bus transaction which sends a data value to the second I/O device, the bus transaction is received by the first bus slave. The first bus slave then determines that the bus transaction needs to be forwarded to the second bus.

Accordingly, the first bus slave accesses the first FIFO memory in the buffer manager and obtains an address cell identifier. Using the address cell identifier, the first bus slave accesses the identified address cell stores the data value address and if necessary, the data value's coherency status in the address cell. In the corresponding request cell, the first bus slave designates the second bus in the target bus identifier, the bus transaction code in the action code (also called the bus transaction code), and the first bus in the owner bus identifier. Furthermore, the first bus slave stores the data value associated with the bus transaction in the corresponding data cell.

In a different example, assume that a first cache coherency filter assigned to a first bus determines that a cache line access requires a bus transaction on a second bus to ensure cache coherency. In this example, the first cache coherency filter accesses the first FIFO memory in the buffer manager and obtains an address cell identifier.

The first coherency filter uses the address cell identifier to access the identified address cell. The first coherency filter then stores the cache line address and the coherency status information in the address cell. In addition, in the request cell, the first coherency filter designates the second bus in the target bus identifier, the appropriate bus transaction code and the first bus in the bus identifier. In this example, however, the corresponding data cell remains empty because the cache line data is not needed to ensure cache coherency. Once a bus transaction information has been added to the cells, the proper buses must obtain the bus transaction information and execute the desired bus transaction.

In the preferred embodiment, a plurality of bus priority encoders in the central request list are connected to the request cells. As explained above, the target bus identifier in the request cells identify the destination bus. Generally speaking, the bus priority encoders evaluate the target bus identifiers in the request cells to determine the which bus should perform the bus transaction.

For example, assume that the target bus identifiers in the request cells designate a first bus and a second bus. In this example, the first bus priority encoder evaluates the target bus identifiers in the request cells to identify which request cells are for the first bus while the second bus priority encoder evaluates the target bus identifiers to identify which request cells are for the second bus.

In addition to identifying the destination buses, each bus priority encoder also determines which of the bus request cells associated with a particular bus has the highest priority. In the preferred embodiment, each bus priority encoder determines the highest priority bus request cell using round robin techniques. The round robin techniques ensure that each bus priority encoder sequentially assigns the highest priority to the bus request cells.

Each bus priority encoder forwards the highest priority bus request cell to one of the bus masters. As explained above, in addition to having a bus identifier, the request cell also contains a bus transaction code. The bus master then performs the bus transaction identified in the request cell. In some cases, as explained in more detail below, the bus which executes the transaction may need to write data back to the bus which initiated the bus transaction. In such cases, the bus master will use the data cell to store the write-back data and will reuse the request cell to communicate with the originating bus. As explained above, the origination bus is identified by the owner bus identifier existing in the request cell. However, upon completion of the bus transactions, the bus master sets the address cell 500, the request cell 600 and the data cell 700 to free.

While the bus master performs the bus transaction, the bus priority encoder identifies the next highest priority request cell assigned to its bus and forwards the request cell to the bus master. When a bus priority encoder reaches the last bus request cell assigned to its bus, the bus priority encoder cycles back to the first bus request cell assigned to its bus. Assigning the highest priority to each bus request cell on a round robin basis ensures that every bus request cell will eventually be forwarded to the buses. As new request cells are added to the central request list, each of the bus priority encoders obtain immediate access to the new request cells and assign the highest priorities accordingly.

In another aspect of the present invention, the buffer manager contains a plurality of address comparators which identify address conflicts. Typically, address conflicts arise when two different bus transactions relate to the same data value and occur at about the same time. In such situations, it is possible that two bus transactions for the same data may simultaneously try to exist in the address cells, request cells and data cells. As can be expected, such address conflicts can lead to improper results.

In the preferred embodiment, a set of address comparators is assigned to each bus. Each set of address comparators is coupled with one of the coherency filters, one of the bus slaves and all of the address cells in the buffer manager. For each bus transaction, the set of address comparators assigned to that bus compares the bus transaction address with all of the addresses in the address cells. If an address conflict is detected, to ensure proper operation the appropriate actions must be taken as detailed below.

BRIEF DESCRIPTION OF THE DRAWINGS

These and other aspects, advantages and novel features of the invention will become apparent upon reading the following detailed description and upon reference to the accompanying drawings in which:

FIGS. 5A and 5B are block diagrams of the preferred buffer manager.

Figure 1:
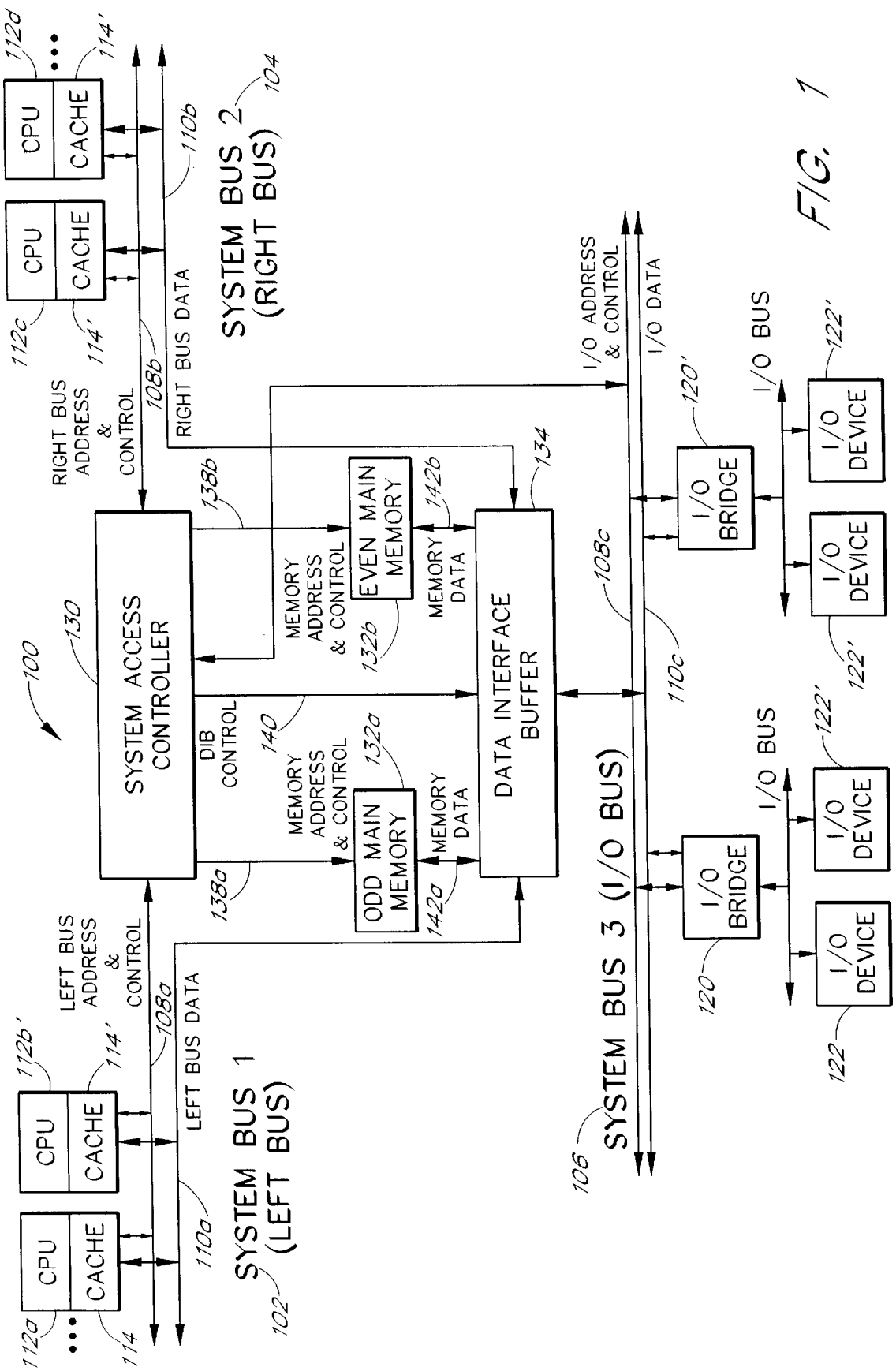
FIG. 1 is a block diagram of the preferred multiprocessing, multiple-bus system.

In the drawings, the first digit of any three-digit number indicates the number of the figure in which an element first appears. For example, an element with reference numeral 402 first appears in FIG. 4. In addition, like reference numerals are used throughout the drawings to indicate correspondence between components.

DETAILED DESCRIPTION OF THE PREFERRED EMBODIMENT

The preferred embodiment provides a cache-coherent, multiple-bus system which 1) interconnects multiple system buses and an I/O bus to a shared main memory and 2) efficiently maintains cache coherency while minimizing the impact to latency and total bandwidth within the system. In particular, the present invention includes coherency filters which coordinate bus-to-bus communications in such a way as to maintain cache memory coherency with a small amount of cross-bus traffic.

Although the present invention is described herein with reference to a preferred multiple-bus system, the invention is not so limited and can be used in a variety of other multiple-bus contexts. To facilitate a complete understanding of the invention, the remainder of the detailed description is organized into the following sections and subsections:
I. Glossary Of Terms and Acronyms
II. Overview Of The Preferred Multiple-bus System
III. The System Access Controller
   A. The Coherency Filters
      1. The Tag Memories
      2. The Tag Controllers
      3. The Cycle Encoders
      4. The Rules Tables
   B. The Buffer Manager
   C. The Central Request List
IV. The Data Interface Buffer
V. Maintaining Cache Coherency
   A. Processing The Bus Read Line Command
   B. Processing The Bus Read Invalidate Line Command
VI. Other Embodiments
VII. Conclusion

I. Glossary Of Terms and Acronyms

ASIC. Application-Specific Integrated Circuits.
BRL command. The Bus Read Line command. The Bus Read Line command reads a cache line on a bus.
BRIL command. The Bus Read Invalidate Line command. The Bus Read Invalidate Line command reads and invalidates a cache line on a bus.
Bus Master. Control logic which controls a particular bus transaction. In some systems where more than one device shares a common bus, each device has the internal logic to become a bus master. After the bus master performs a bus transaction, the bus master relinquishes the bus so that another device can become the bus master. Such devices include processors, I/O devices, memory controllers and the like.
Bus Slave. Control logic which receives bus transactions from a bus master.
Bus Snooping. A technique used by processors with cache memories to monitor memory transactions performed by other processors.
DIB. Data Interface Buffer.
DEFER# signal. The DEFER# signal defers a bus transaction. In the preferred Pentium Pro bus, the DEFER# signal is not one signal but a unique encoding of the control signals which signifies the meaning of a DEFER# signal.
DEN# signal. The DEN# signal indicates when a bus transaction can be deferred. A deferred bus transaction is executed out of order. That is, if a first bus transaction is deferred, a second bus transaction is completed before the deferred first bus transaction. The processor which issues a bus transaction indicates whether the bus transaction is deferrable by asserting its DEN# signal.
FIFO. A first-in, first-out memory. A FIFO is a memory queue which outputs items in the same order as the items were added, that is, the first item in is the first item out.
HIT# signal. In the preferred embodiment, each processor has a HIT# signal which are wired ORed together on the bus. A processor generates a HIT# signal to indicate that a data value is shared. For example, when a first processor requests a data value, a second processor monitors the bus transaction and generates the HIT# signal when the second processor contains a copy of the requested data value.
HITM# signal. In the preferred embodiment, each processor has a HITM# signal. A processor asserts a HITM# signal when a bus snoop operation indicates that a modified data value exists in the processor's cache memory.
I/O. Input/Output. Typically refers to input/output transactions with input/output devices.
PCI bus. Peripheral Component Interconnect Bus.
Processor. Throughout this detailed description processor means a computational or control unit. A processor communicates with the main memory via bus transactions and can include, central processing units, microprocessors, smart Input/Output devices, and any other device which stores, processes or transfers information.
RAM. Random Access Memory.
SRAM. Static Random Access Memory.
SDRAM. Synchronous Dynamic Random Access Memory.
Snoop Hit. A snoop hit occurs when a processor detects that its cache memory contains the data requested in a particular memory transaction.

II. Overview Of The Preferred Multiple-bus System

As illustrated in FIG. 1, the preferred multiple-bus system 100 contains three system buses: a first system bus 102, a second system bus 104 and a third system bus 106. Each system bus 102, 104 and 106 further comprises a set of address and control lines 108*a*, 108*b* and 108*c*, as well as a set of data lines 110*a*, 110*b* and 110*c*. The address and control lines are referred to collectively as the address and control lines 108. The data lines 110*a*, 110*b* and 110*c* are referred to collectively as the data lines 110. Throughout this detailed description, the first system bus 102 is also referred to as the left bus 102, the second system bus 104 is referred to as the right bus 104 and the third system bus 106 is referred to as the I/O bus 106.

In the preferred embodiment, each system bus 102, 104 and 106 are Pentium Pro system buses which are defined by Intel Corporation. The Pentium Pro system buses provide 36 bits of address, 64 bits of data and a variety of control and error correction signals. While the preferred embodiment utilizes the Pentium Pro bus, one of ordinary skill in the art will recognize that the present invention is adaptable to a wide range of system buses which implement a snooping cache coherency protocol. Furthermore, the format of one bus may differ from the format of another bus.

Connected to the left bus 102 are a plurality of processors 112*a* and 112*b*, etc. Connected to the right bus 104 are a plurality of processors 112*c* and 112*d*, etc. The processors 112*a*, 112*b* 112*c* and 112*d* are collectively referred to as the processors 112. In the preferred embodiment each processor 112 has an internal cache unit 114. While four processors 112 are illustrated, each bus 102 and 104 can be connected to additional processors 112. The processors 112 in the preferred embodiment are Pentium Pro processors provided by Intel Corporation. While the preferred embodiment of the present invention utilizes Pentium Pro processors. One of ordinary skill in the art, however, will recognize that the present invention is adaptable to a wide range of processors 112 which are compatible with a particular system bus.

The cache memories 114 in the processors 112 improve processing performance by storing data locally. Typically, the cache memories 114 allow the processors 112 to access data values while using less bus bandwidth. The cache memories 114 of the preferred embodiment, organize the data values into cache lines wherein each cache line contains 32 bytes of data.

The third system bus 106 in the preferred embodiment transmits input/output (I/O) transactions between a plurality of I/O bridges 120 and the main memory 132, and is thus called the I/O bus 106. The preferred I/O bridge 120 is a 82450 GX PCIset Orion PCI Bridge manufactured by Intel Corporation. In the preferred embodiment, the I/O bridge 120 transfers I/O transactions from the I/O bus 106 to a plurality of I/O devices 122 using a PCI bus. However, one of ordinary skill in the art will recognize that the I/O bridges 120 may be implemented with a wide range of devices which provide accesses to a variety of I/O devices 122. In addition, the I/O bridge 120 is optional and compatible I/O devices 122 may be directly attached to the I/O bus 106.

The preferred multiple-bus system 100 also includes an odd main memory module 132a, and an even main memory module 132b and a data interface buffer 134. In the preferred embodiment, the odd main memory module 132a and the even main memory module 132b are collectively referred to as the main memory 132. The preferred odd memory module 132a and the preferred even memory module 132b comprise synchronous dynamic random access memory (SDRAM) which can vary in size from 32 megabytes to 32 gigabytes. The SDRAM uses a synchronous pipeline interface which provides high-speed bursting of data.

The preferred multiple-bus system also includes a system access controller 130 and a data interface buffer 134. Broadly speaking, the system access controller controls the operation of the multiple-bus system. The system access controller is coupled to the address and control lines 108a, 108b and 108c for each bus 102, 104 and 106. In addition, the system access controller 130 is also coupled to a set of odd memory address and control lines 138a, a set of even memory address and control lines 138b, and a set of data interface buffer (DIB) control lines 140.

The data interface buffer 134, on the other hand, provides a data path among the different buses 102, 104 and 106 and for the main memory 132. The data interface buffer 134 is coupled to the data lines 110a, 110b and 110c for each bus 102, 104 and 106. In addition, the data interface buffer 134 is coupled to a set of main memory data lines 142.

The processors 112 fill their cache memories 114 by reading data from the main memory 132. In order to maintain up-to-date data in the cache memories 114, the cache memories 114 within the processors 112 on a particular bus, snoop the main memory bus transactions which occur on their assigned bus 102, 104 or 106. This is called bus snooping.

When a cache memory 114 contains the same cache line as the cache line identified in a bus transaction, a snoop hit occurs. When a snoop hit occurs, the processor 112 or processors 112 which have a shared copy of the data value assert the HIT# signal. The HIT# signal is one of the address and control lines 108. The HIT# signal notifies the other processors 112 that the data associated with the memory transaction is shared with the processors 112. In the preferred embodiment, if none of the other processors 112 assert the HIT# signal, the requesting processor sets the coherency status of the desired data value to the owned state.

In other cases, the processors 112 may modify a cache line in their cache memories 114. However, to reduce bus traffic, the cache memories 114 may not send the modified cache line back to the main memory 132 until another processor 112 requests the same cache line from main memory 132. For example, when a processor 112 updates a cache line, the other processors 112 may not have a copy of the cache line or desire to obtain the same cache line. In such cases, the processor 112 with the up-to-date cache line does not write the up-to-date cache line back to main memory 132; rather, the processor 112 keeps the up-to-date cache line within its cache memory 114.

In the preferred embodiment, one of the processors 112 asserts a HITM# signal when a bus snoop operation indicates that a modified cache line exists in the processor's cache memory 114. The HITM# signal is one of the address and control lines 108 and indicates that the processor 112 with the up-to-date cache line needs to write the cache line back to main memory 132. For example, in the preferred embodiment, assume a first processor 112a on the left bus 102 contains a modified cache line in its cache memory 114. When a second processor 112b on the left bus 102 desires to obtain a copy of the same cache line, the second processor 112b takes control of the left bus 102 and executes a memory transaction to main memory 132 which identifies the desired cache line. The first processor 112a then snoops the memory transaction and determines that it contains a modified version of the desired cache line.

In response, the first processor 112a asserts its HITM# signal which indicates that it contains a modified version of the cache line. The first processor 112a takes command of the left bus 102 and writes the modified cache line back to main memory 132. After the first processor 112a writes the modified cache line back to main memory 132, the second processor 112b reinitiates the main memory transaction and obtains the up-to-date cache line.

The preferred processors 112 can indicate whether the bus transaction can be deferred. The processor 112 which issues a bus transaction indicates whether the bus transaction is deferrable with its DEN# signal. The processor which asserts the HITM# signal controls the transaction response. Once the processors asserts the HITM# signal, the processor either executes the bus transaction in order (as the memory would have done) or if the transaction is deferrable, the system access controller 130 asserts a DEFER# signal which defers the bus transaction. The DEFER# signal is an encoding of certain control lines 108.

III. The System Access Controller

Figure 2:
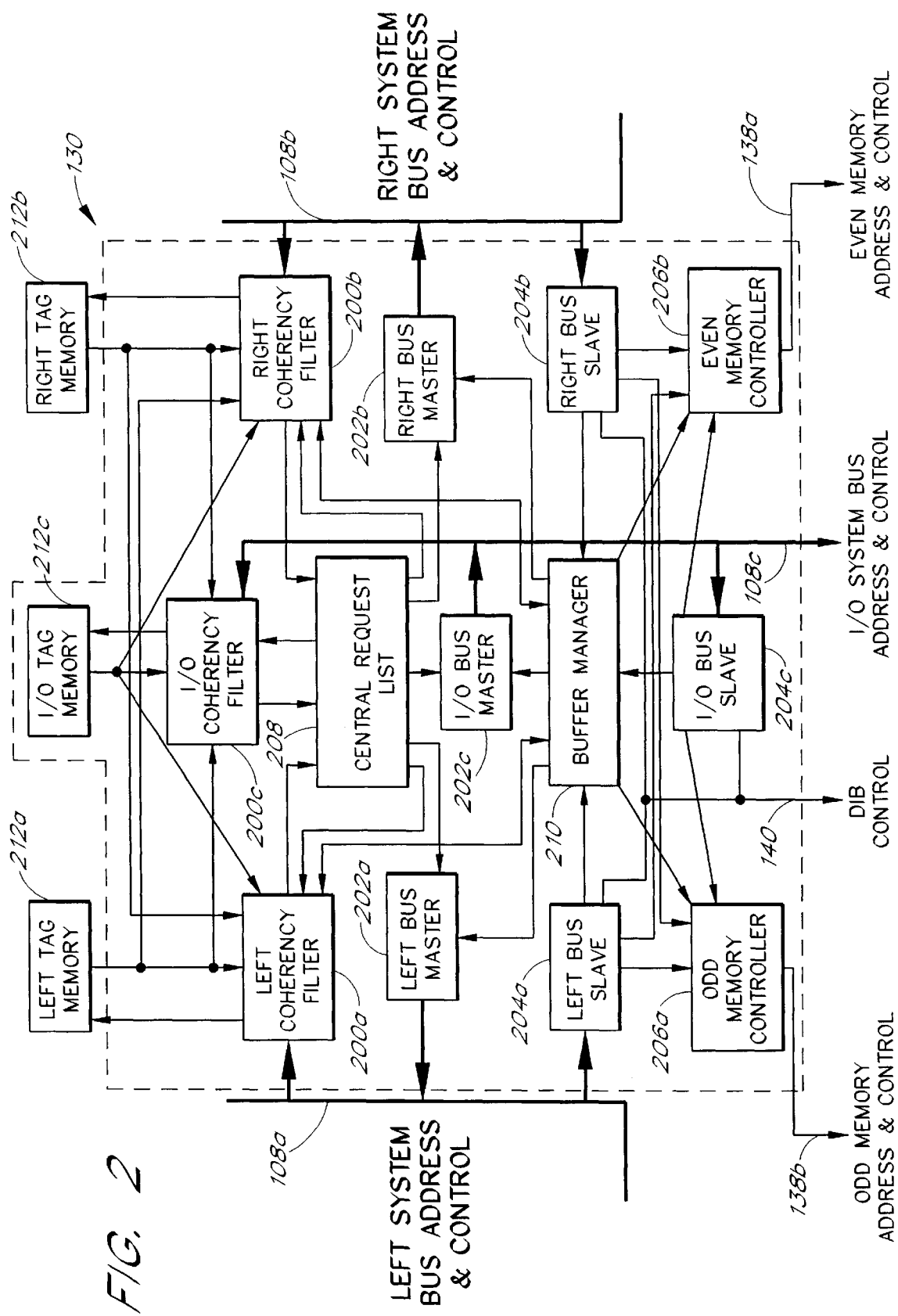
FIG. 2 is a block diagram of a preferred system access controller.

Focusing now on system access controller 130, as illustrated in FIG. 2, the preferred system access controller 130 is implemented as an Application-Specific Integrated Circuit (ASIC). Broadly speaking, the system access controller 130 controls the three buses 102, 104 and 106 and the main memory 132 while maintaining cache coherency in the multiple-bus system 100.

Preferably, the system address controller 130 contains a left coherency filter 200a, a right coherency filter 200b, and an I/O coherency filter 200c. Throughout this detailed description, the left coherency filter 200a, the right coherency filter 200b, and the I/O coherency filter 200c are referred to as the coherency filters 200. The system access controller 130 also contains a left bus master 202a, a right bus master 202b and an I/O bus master 202c. Throughout this detailed description, the left bus master 202a, the right bus master 202b and the I/O bus master 202c are referred to collectively as the bus masters 202.

In addition, the system access controller 130 contains a left bus slave 204a, a right bus slave 204b, and an I/O bus slave 204c. Throughout this detailed description the left bus slave 204a, the right bus slave 204b and the I/O bus slave 204c are collectively referred to as the bus slaves 204. Furthermore, the system access controller 130 contains an odd memory controller 206a and an even memory controller 206b. Throughout this detailed description, the odd memory controller 206a and the even memory controller 206b are collectively referred to as the memory controllers 206.

The system access controller 130 also contains a central request list 208 and a buffer manager 210. Finally, the system access controller 130 is coupled to an external left tag memory 212a, an external right tag memory 212b and an internal I/O tag memory 212c. Throughout this detailed description, the left tag memory 212a, the right tag memory 212b and the I/O tag memory 212c are collectively referred to as the tag memories 212.

In the preferred embodiment, the left tag memory 212a, the left coherency filter 200a, the left bus master 202a and the left bus slave 204a are assigned to the left bus 102. The right tag memory 212b, the right coherency filter 200b, the right bus master 202b, and the right bus slave 204b are assigned to the right bus 104. The I/O tag memory 212c, the I/O coherency filter 200c, the I/O bus master 202c, and the I/O bus slave 204c are assigned to the I/O bus 106.

Focusing now on the interconnections in the system access controller 130, the left coherency filter 200a is in communication with the left bus address and control lines 108a, left tag memory 212a, the right tag memory 212b, the I/O tag memory 212c, the buffer manager 210 and the central request list 208. The right coherency filter 200b is in communication with the right bus address and control lines 108b, the left tag memory 212a, the right tag memory 212b, the I/O tag memory 212c, the buffer manager 210 and the central request list 208. The I/O coherency filter 200c is in communication with the I/O bus address and control lines 108c, the left tag memory 212a, the right tag memory 212b, the I/O tag memory 212c, the buffer manager 210 and the central request list 208.

The left bus master 202a is in communication with the left bus address and control lines 108a and the central request list 208. The right bus master 202b is in communication with the right bus address and control lines 108b and the central request list 208. The I/O bus master 202c is in communication with the I/O bus address and control lines 108c and the central request list 208.

The left bus slave 204a is in communication with the left bus address and control lines 108a, the odd memory controller 206a, the even memory controller 206b and the buffer manager 210. The right bus slave 204b is in communication with the right bus address and control lines 108b, the odd memory controller 206a, the even memory controller 206b and the buffer manager 210. The I/O bus slave 204c is in communication with the I/O bus address and control lines 108c, the odd memory controller 206a, the even memory controller 206b and the buffer manager 210.

Accordingly, the central request list is in communication with the left coherency filter 200a, the right coherency filter 200b, the I/O coherency filter 200c, the left bus master 202a, the right bus master 202b, and the I/O bus master 202c. The buffer manager 210 is in communication with the left coherency filter 200a, the right coherency filter 200b, the I/O coherency filter 200c, the left bus master 202a, the right bus master 202b, the I/O bus master 202c, the left bus slave 204a, the right bus slave 204b, the I/O bus slave 204c, the odd memory controller 206a and the even memory controller 206b.

Focusing now on the bus masters 202, the bus masters 202 control a bus transaction on their assigned buses 102, 104 and 106. For example, the left bus master 202a initiates bus transactions on the left bus 102. After the bus master 202 performs one or more bus transactions, the bus master 202 relinquishes the bus so that another device can become the bus master. The control logic for implementing the bus masters 202 is well known to one of ordinary skill in the art.

Focusing now on the bus slaves 204, the bus slaves 204 receive bus transactions initiated by one of the processors 112 or I/O bridges 120 on their assigned buses 102, 104 and 106. For example, one of the processors 112 may initiate a read bus transaction for a particular data value in the main memory 132. The bus slave 204 receives the bus transaction and obtains the requested data value from the main memory 132. The control logic for implementing the bus slaves 204 is well known to one of ordinary skill in the art.

The odd memory controller 206a and the even memory controller 206b control accesses to the odd main memory module 132a and the even main memory module 132b respectively. The odd memory controller 206a and even memory controller 206b controls the odd main memory module 132a and even main memory module 132b using memory control techniques which are well known to those of ordinary skill in the art.

A. The Coherency Filters

Focusing now to the preferred coherency filters 200, each coherency filter 200 determines what bus transaction or set of bus transactions are needed to maintain cache coherency. In the preferred embodiment, each coherency filter 200 improves performance in the multiple-bus system 200 by limiting cross-bus traffic when cross-bus transaction are not necessary to maintain cache coherency.

Figure 3:
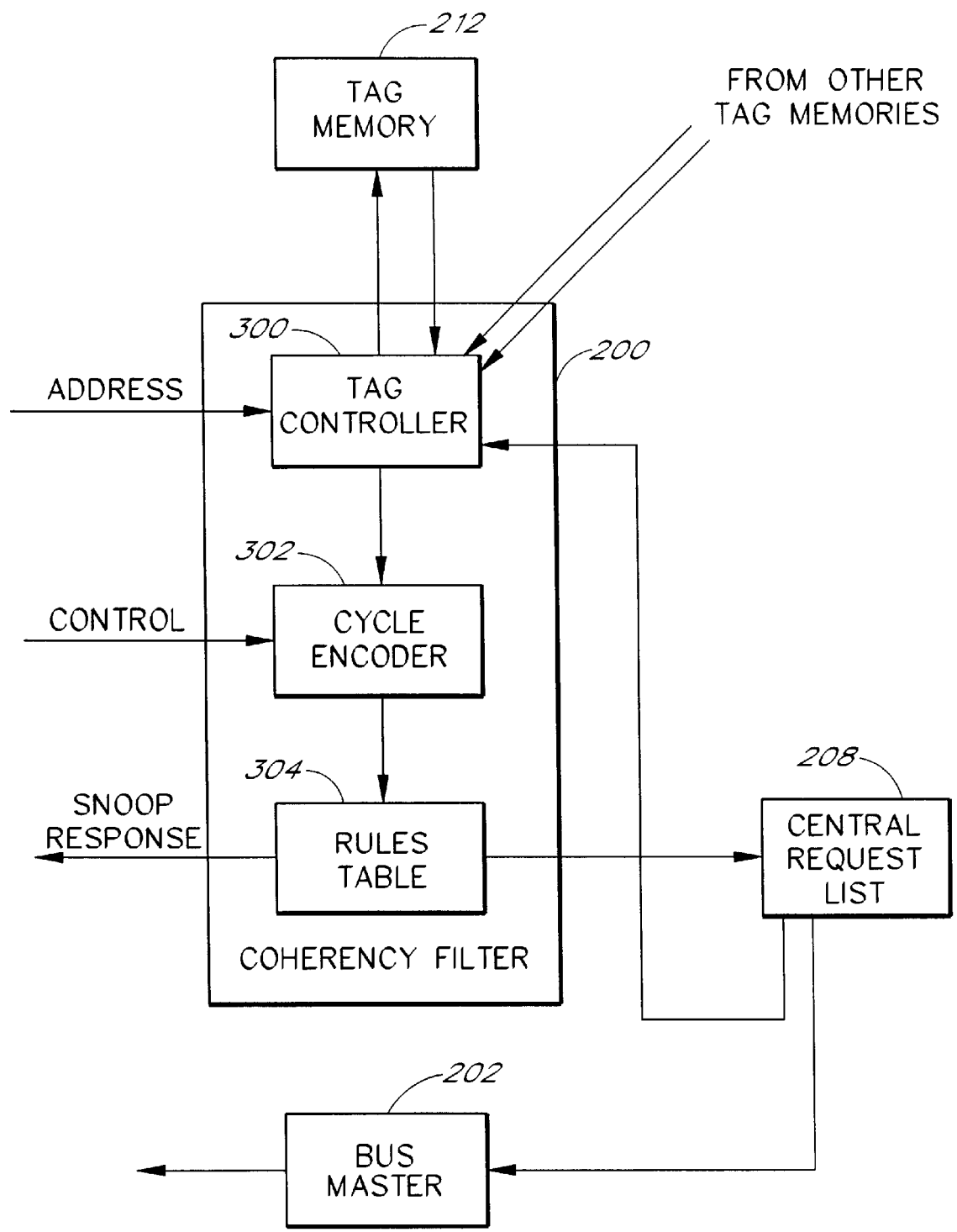
FIG. 3 is a block diagram of a preferred coherency filter and tag memory.

As discussed above, the left coherency filter 200a monitors the left bus address and control lines 108a, the right coherency filter 200b monitors the right bus address and control lines 108b and the I/O coherency filter 200c monitors the I/O address and control lines 108c. As illustrated in FIG. 3, each coherency filter 200 contains a tag controller 300, a cycle encoder 302 and a rules table 304. In addition, each coherency filter 200 is assigned one of the tag memories 212.

1. The Tag Memories

Preferably, each tag memory 212 is stored in a static random access memory (SRAM) located external to the system access controller 130. The left tag memory 212a and the right tag memory 212b are preferably the same size while the I/O tag memory is smaller in size because of the small cache units which are typically coupled to I/O bridges 120 and the like. The tag memory 212 assigned to a particular bus maintains a superset record of 1) the cache lines located in the cache memories 114 connected to the assigned bus, and 2) the cache status of the cache lines. In the preferred embodiment, the cache status is represented with a set of cache coherency states which comprise fewer states than the cache coherency states in the cache memories 114.

As is well known, each cache line in main memory is identified with a cache line address. The size of a cache line varies from one multiple-bus system 100 to another multiple-bus system 100. In the preferred embodiment, a cache line contains 32 eight-bit data values (256 bits). Each tag memory 212 stores the cache line addresses which identify the cache lines, not the actual cache lines. In addition to storing the cache line addresses, each tag memory 212 also stores coherency status information associated with the cache line addresses. Thus, each tag memory 212 maintains information regarding the probable contents and status of cached data stored in the cache memories 114 connected to the tag memory's assigned bus.

For example, when the processor 112a on the left bus 102 generates a read bus transaction which accesses a cache line in the main memory 132, the processor 112a places the desired cache line address on the left bus address and control lines 108a. As is discussed in more detail below, the left coherency filter 200a receives the desired cache line address and stores the cache line address in the left tag memory 212a. In addition, the left coherency filter 200a stores the coherency status associated with the cache line address in the left tag memory 212a.

The coherency status associated with each cache line address relates to the status of the cache line in the cache memories 114. In the preferred embodiment, the coherency status contains three different coherency states—an invalid state, a shared state or an owned state. The invalid state means that the cache line is invalid and that a processor 112 should not use it. The shared state means that a processor 112 cannot modify the cache line. Shared cache lines, for example, are often program instructions which are not modified. The owned state means that the cache line may be modified by a processor 112 which owns the cache line. The preferred embodiment utilizes the Invalid, Shared and Owned protocol because of its adaptability to a wide range of cache coherency protocols including the MESI protocol employed by the Pentium Pro processors 112.

A person of ordinary skill in the art, however, will appreciate that the coherency status of a cache line is not limited to the Invalid, Shared and Owned protocol. Indeed, a person of skill in the art will recognize that the coherency status could be implemented with a wide range of coherency protocols such as the Modified, Exclusive, Shared and Invalid (MESI) protocol, the Modified, Owned, Exclusive, Shared and Invalid (MOESI) protocol, the Modified, Shared, Invalid (MSI) protocol, the Berkeley protocol, the University of Illinois coherency protocol, or the like.

The coherency status could also be implemented with a two state coherency protocol such as a two state Invalid and Owned protocol. In dual-bus systems, a two-state coherency protocol all buses are presumed to have a shared copy of all cache lines. This often reduces the size of a coherency memory, because when all of the cache lines are treated as if they are shared, the coherency memory needs to only maintain a record associated with the data values in the invalid and owned states. Advantageously, when a bus performs a standard read transaction for shared data, the shared status information would not be stored in the coherency memory. This reduces problems associated with maintaining a superset of coherency status information in the coherency memories.

In such a two state system, however, all exclusive read transactions or invalidate transactions require one or more cross-bus transactions to ensure cache coherency. Such cross-bus transactions are needed to see if another bus actually contains a shared version of the data associated with an exclusive read transaction of an invalidation command. While in dual-bus systems a two-state protocol may result in higher total performance, in with more than two buses, the benefit of two-state protocols is highly dependent on the characteristic of the work load.

The preferred Pentium Pro processors 112 do not output accurate coherency status information about the cache lines stored in their internal cache memories 114. For example, an internal cache memory 114 may discard an unmodified cache line without signaling that the cache line has been discarded. In the preferred embodiment of the present invention, each tag memory 212 is uniquely adapted to ensure cache coherency for internal cache memories 114 which do not output current coherency status information.

Each tag memory 212 ensures cache coherency by maintaining a superset of the cache line addresses which might possibly be currently held in the internal cache memories 114 connected to a particular bus. For example, the left tag memory 212 maintains a superset of the cache line addresses which might possibly be held in the processor 112a and the processor 112b internal cache memories 114. Because the superset of cache line addresses does not necessarily contain accurate tag status information, a tag memory 212 may indicate that a particular cache line in a cache memory 114 is in the shared state when the cache memory 114 has, in fact, discarded the cache line. In other cases, the superset of cache line addresses in a tag memory 212 may indicate that a particular cache line in a cache memory 114 is in the modified state, when the cache memory 114 has, in fact, written the cache line back to main memory 132.

In order to maintain a superset of the cache line addresses, the preferred tag memories 212 use what is called the inclusion rule. The inclusion rule ensures that the cache line addresses stored in the cache memories 114 connected to a particular bus are always a subset of the cache line addresses in the tag memory 212 assigned to that bus. When a cache line address is deleted from one of the tag memories 212, the inclusion rule directs the associated cache memories 114 to invalidate the cache line in their cache memories.

For example, when the left tag memory 212a does not have the memory capacity or associativity to hold a new cache line address, room must be made in the left tag memory 212a for the new cache line address by expelling one of the existing cache line addresses (the old cache line address) from the left tag memory 212. If the old cache line address is in the invalid state (the cache memories 114 connected to the bus no longer are using the cache line associated with the old cache address), the left coherency filter 200a simply replaces the old cache line address with the new cache line address.

However, when the old cache line address is in the shared or owned state, the left coherency filter 200a cannot expel the old cache line address from the left tag memory 212a until the cache memories 114 invalidate the old cache line address. As explained above, the left tag memory 212a must maintain a superset of the cache line addresses in the cache memories 114 connected to the left bus 102, thus the old cache line address must first be invalidated in the cache memories 114 before the left tag memory 212a can replace the old cache line address with the new cache line address.

As discussed in more detail below, the left coherency filter 200a invalidates the old cache line address in the cache memories 114 connected to the left bus 102 by performing an invalidation bus transaction. The invalidation bus transaction occurs on the left bus which directs the cache memories 114 to internally invalidate the old cache line address.

In some cases, however, the old cache line may be in the owned state and one of the cache memories 114 may have modified the old cache line. If the cache memory 114 has possibly modified the old cache line, a bus read invalidate line (BRIL) transaction is performed. If the cache memory 114 has modified the old cache line, then during the bus read invalidate line transaction, the cache memory 114 takes command of the bus transaction and writes the modified cache line corresponding to the old cache line address back to main memory 132. After writing the modified cache line back to the main memory, the left coherency filter 200*a* replaces the old cache line address in the left tag memory 212*a* with the new cache line address. Thus, to maintain a superset of cache line addresses in the tag memories 212, in some cases, before an old cache line can be replaced, the cache memories 114 may have to write modified data back to the main memory 132.

Figure 4:
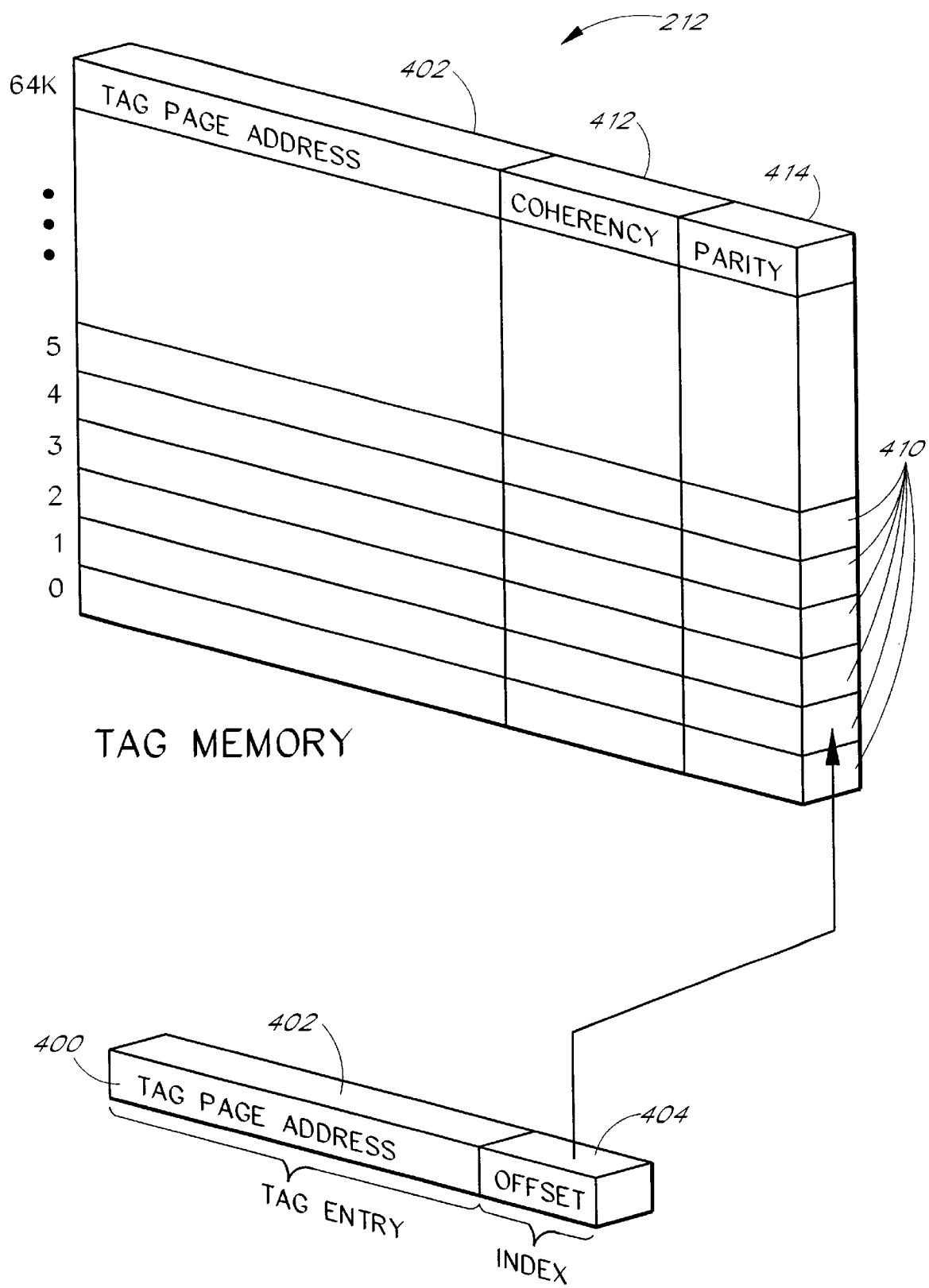
FIG. 4 is a block diagram of a preferred cache line address and a preferred tag memory.

The format of the cache line address 400 and each tag memory 212 is shown in FIG. 4. The cache line address 400 is conceptionally divided into two parts. The first part contains a tag page address 402, while the second part contains the offset address 404. In the preferred embodiment, the number of tag entries 410 in a tag memory 212 defines the size of what is called a tag page. Preferably, each of the tag memories 212 have the number of tag entries 410 and thus, the same tag page size.

In the preferred embodiment, the tag page address 402 identifies the tag page which contains the cache line address 400 while the offset address 404 identifies the location of the cache line address 400 within the tag page. In particular, the high-order bits in the cache line address 400 identify the tag page address while the lower-order bits identify the offset address 404.

Typically, the low-order bits are called indexes because the low-order bits identify the location of a cache line address within a tag page. For example, for the first cache line address 400, the high-order address bits identify the tag page address 402 and the low-order address bits identify the location of the cache address line 400 in the tag page.

Because the tag page can vary in size, the number of bits assigned to the tag page address 402 and the offset address 404 also vary. In the preferred embodiment, if the left tag memory 212*a* and the right tag memory 212*b* contain $2^{16}$ entries, the offset address 404 comprises the lower sixteen bits of the cache line address 400 and the tag page address 402 comprises the upper 15 bits of the cache line address 400. As explained above, the I/O tag memory 212*c* is smaller in size and thus contains fewer entries. In the preferred embodiment, the I/O tag memory 212 contains 32 entries.

The following table illustrates the different sizes of the tag memory 212 and the sizes of the corresponding tag page address 402 and offset address 404 in a cache line address 400.

| Size Of Tag Memory | Width Of Tag Page Address | Width Of Offset |
| --- | --- | --- |
| $2^{16}$ entries | 15 bits | 16 bits |
| $2^{17}$ entries | 14 bits | 17 bits |
| $2^{18}$ entries | 13 bits | 18 bits |
| $2^{19}$ entries | 12 bits | 19 bits |

In the preferred embodiment, the coherency filters 200 store the cache line addresses 400 in the tag memories 200 using direct mapping techniques. Direct mapping means that each cache line address 400 maps to one particular tag entry 410. FIG. 4 illustrates a preferred tag memory 212 comprising $2^{16}$ tag entries 410. Each tag entry 410 contains the tag page address 402 of the cache line address 400. In addition, each tag entry 410 contains the coherency status bits 412 and a parity bit 414. The parity bit 414 provides well known parity error detection.

When a processor 112 accesses a cache line address 400, the coherency filters 200 use the offset address 404 to identify a particular tag entry 410. The coherency filters 200 then store the tag page address 402 in the identified tag entry 410. For example, when the first processor 112*a* on the left bus 102 accesses the first cache line address 400 in a first tag page, the left coherency filter 200*a* uses the cache line offset address 404 to locate the first tag entry 410 in the left tag memory 212*a*. The left coherency filter 212*a* then stores the tag page address 402 into the first tag entry 410 in the left tag memory 212*a*.

In addition to storing the tag page address 402 of the cache line addresses 400, the tag entries 410 also store a set of coherency status bits 412 for the cache line addresses 400. Preferably, the coherency status bits 412 in a tag entry 410 contain the preferred three coherency states—the invalid state, the shared state or the owned state. The three coherency states are represented with two coherency status bits 412. The following table defines the coherency state assigned to the coherency status bits 412.

| Coherency Status Bits | Coherency State |
| --- | --- |
| 00 | Invalid |
| 01 | Shared |
| 10 | Owned |
| 11 | (Reserved) |

2. The Tag Controllers

The control logic for direct mapping the cache line addresses 400 into the tag memories 212 is located in the tag controllers 300. The tag controller 300 assigned to the left bus 102 is called the left tag controller 300*a*. The tag controller 300 assigned to the right bus 104 is called the right tag controller 300*b*. The tag controller 300 assigned to the I/O bus 106 is called the I/O tag controller 300*c*. For example, the left tag controller 300 contains the direct mapping logic which direct maps the cache line addresses 400 into the left tag memory 212*a*.

The control logic in the tag controllers 300 is similar to the control logic used to direct map the cache lines into a cache memory 114. Thus, the tag controllers 300 use direct mapping logic known to those of ordinary skill in the art. This differs, however, from the cache control logic in the preferred pentium pro processors 112 which utilize four-way set associative mapping.

As explained in more detail below, the coherency filters 200 determine whether to perform a cross-bus transaction based in part on the coherency status information in the tag memories 212. In the preferred embodiment, each tag controller 300 is also coupled to its own tag memory 212 and the tag memories 212 assigned to the other buses. While each tag controller 300 can access the tag entries 410 in the tag memories 212, each tag controller 300 only modifies the tag entries in its assigned tag memory 212. For example, the left tag controller 300*a* can access the tag entries 410 in the left tag memory 212*a*, the right tag memory 212*b* and the I/O tag memory 212*c*, the left tag controller 300 only modifies the tag entries 410 in the left tag memory 212*a*.

For instance, when the left bus 102 transmits a bus transaction for a particular cache line address 400, the left tag controller 300*a* uses the cache line address 400 to obtain the corresponding coherency status bits 412 from the right tag memory 212*a* and the I/O tag memory 212*b*. In this example, the cache line address 400 is directly mapped into the right tag memory 212*b* to obtain the right coherency status bits. In addition, the cache line address is directly mapped into the I/O tag memory 212*c* to obtain the I/O coherency status bits 412. Throughout this detailed description the coherency status bits 412 obtained from the other tag memories 212 assigned to the other buses will be referred to as the remote coherency status bits 412. Once the left tag controller 300*a* obtains the remote coherency status bits 412, the left tag controller 300*a* forwards the remote coherency status bits 412 to the cycle encoder 302.

3. The Cycle Encoders

Each cycle encoder 302 determines what kind of bus transaction is occurring on one of the buses 102, 104 or 106. The cycle encoder 302 assigned to monitor the left bus 102 is called the left cycle encoder 302*a*. The cycle encoder 302 assigned to monitor the right bus 104 is called the right cycle encoder 302*b*. The cycle encoder 302 assigned to monitor the I/O bus 102 is called the I/O cycle encoder 302*c*. Thus, each cycle encoder 302 monitors the address and control lines 108 associated with its assigned bus 102, 104 or 106.

Preferably, the cycle encoder 302 uses well known techniques associated with the particular bus protocol implemented on the buses 102, 104 and 106, to monitor the bus control lines in order to determine whether the bus transaction is reading from or writing data to the main memory 132. In the preferred embodiment, the cycle encoder 302 uses well known techniques for determining which pentium pro bus transaction is reading from or writing data to the main memory 132. Once the cycle encoder 302 determines the type of bus transaction occurring on its assigned bus, the cycle encoder 302 transmits the type of bus cycle to the rules table 304.

4. The Rules Tables

Focusing now on the rules table 304 illustrated in FIG. 3, the rules table determines when to perform cross-bus transactions to ensure cache coherency. In the preferred embodiment, the rules table 304 assigned to the left bus 102 is called the left rules table 304*a*. The rules table 304 assigned to the right bus 102 is called the right rules table 304*b*. The rules table 304 assigned to the I/O bus is called the I/O rules table 304*c*.

Each rules table 304 evaluates the bus transaction type information and the remote coherency status bits 412 obtained from the cycle encoder 302. In the preferred embodiment, each rules table 304 is a large truth table located in a static random access memory (SRAM). Stored in each rule table memory location, is the type of cross-bus transactions and local bus transactions which need to be executed to ensure cache coherency.

In addition, the rules table 304 performs snoop actions. In the preferred embodiment, the rules table 304 may assert the HIT# signal when the remote tag memories indicate that they have a shared copy of the cache line. Asserting the HIT# signal indicates that one or more cache memories on the remote buses have a shared copy of the cache line. The rules table 304 may also assert the HIT# signal to force code read transactions into the shared state such that future code read transactions on the other buses do not generate cross-bus traffic.

The specific cross-bus transaction codes needed to ensure cache coherency are loaded into the rules table 304 under control of the system access controller 130. The preferred multiple-bus system 100 loads the cross-bus transaction codes into the rules table 304 during initialization of the system. Because the cross-bus transactions codes can be modified, the cross-bus transactions can be flexibly tuned for different multiple-bus systems 100.

B. The Buffer Manager

The buffer manager 210, the central request list 208 and the data interface buffer 134 as illustrated in FIGS. 1 and 2 optimize communications between multiple buses. In the preferred embodiment, the central request list 208, the buffer manager 210 and the data interface buffer 134 contain a multiported pool of memory cells (not shown) which are accessible by all of the buses 102, 104 and 106. Advantageously, any bus 102, 104 or 106 can read from or write to any other bus 102, 104 or 106 without using independent connection paths.

In the preferred embodiment, information associated with each bus transaction is subdivided into three portions which are stored in three different memory cells called the address cells, the request cells and the data cells. Accordingly, a one-to-one correspondence exists between each data cell, each request cell and each address cell. As discussed in more detail below, the address cells are located in the buffer manager 210, the request cells are located in the central request list 208 and the data cells are located in the data interface buffer 134.

Figure 5A:
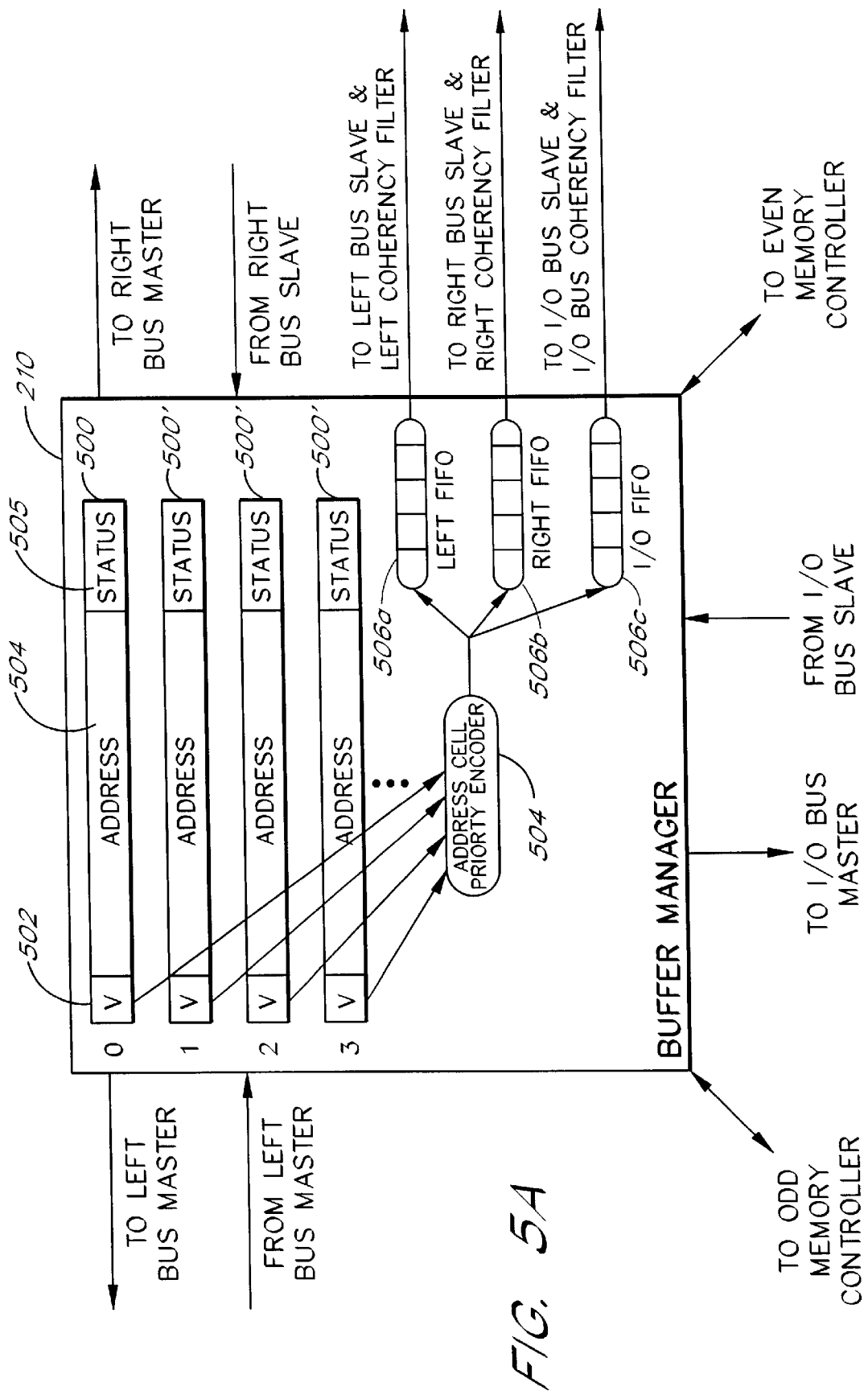

The preferred buffer manager 210 is illustrated in FIGS. 5A and 5B. Focusing on FIG. 5A, the buffer manager 210 includes a pool of address cells 500, an address cell priority encoder 504, a left first-in, first-out (FIFO) memory 506*a*, an I/O FIFO 506*b* and a right FIFO 506*c*. Each address cell 500 is multiported and in communication with the address cell priority encoder 504, the bus masters 202, the bus slaves 204, the memory controllers 206 and as illustrated in FIG. 5B, the comparators 510.

The preferred buffer manager 210 contains 64 address cells 500. As illustrated in FIG. 5A, each address cell 500 contains an "in-use" bit 502, a memory address 504 and a set of data cell status bits 505. The in-use bit 502 indicates whether a particular address cell 500 is available for use. In the preferred embodiment, the in-use bit 502 is set to indicate whether an address cell 500 is in use or free. The memory address 504 contains the memory address 504, while the data cell status bits 505 indicate the type of bus transaction. In particular, the data cell status bits 505 indicate whether an invalidation bus transaction will be performed.

Focusing now on the address cell priority encoder 504, the address cell priority encoder 504 determines which address cells 500 are in-use and which address cells 500 are free to receive new bus transaction information. In the preferred embodiment, the logic in the address cell priority encoder 504 determines which address cells 500 are free by evaluating the in-use bit 502 in each address cell 500. If the in-use bit 502 is set, the address cell 500 is in use. If the in-use bit 502 is not set, the address cell is free. The free cell is selected in a round robin fashion.

The address cell priority encoder 504 not only determines which address cells 500 are free, but also assigns the free address cells 500 to the different buses 102, 104 and 106. Preferably, the address cell priority encoder 504 assigns the free address cells 500 to different buses 102, 104 and 106 in a round robin fashion. As explained in more detail below, when the bus transaction information is stored in the free address cells 500 the in-use bit 502 is set to indicate that the address cell 500 is not free.

For example, assume that first, second and third address cells 500 are free. The preferred priority encoder 504 determines that the first, second and third address cells 500 are free and assigns the first address cell 500 to the left bus 102, the second address cell 500 to the right bus 104 and the third address cell 500 to the I/O bus 106. When a fourth address cell 500 becomes free, the address cell priority encoder 504 cycles back to the left bus 102 and assigns the fourth address cell 500 to the left bus 500. While the preferred address cell priority encoder 504 assigns the free address cells to different buses, one of ordinary skill in the art will appreciate that the address cell priority encoder 504 can employ a wide range of allocation schemes to assign the free address cells 500 to the different buses 102, 104 and 106.

Focusing now on the FIFO memories 506 in the buffer manger, the FIFO memories 506 temporarily store address cell identifiers which identify the assigned address cells 500. An address cell identifier is a data variable which contains the memory location of an assigned address cell 500. In the preferred embodiment, the address cell identifiers identify the 64 address cells 504. As discussed in more detail below, the bus masters 202 use the address cell identifiers in the FIFO memories 506 to access the address cell memory location identified by the address cell identifier.

In the preferred embodiment, each FIFO memory 506 outputs to the bus slaves 204 and the coherency filters 200. Thus, the left FIFO memory 506a outputs to the left bus slave 204a and the left coherency filter 200a. The right FIFO memory 506b outputs to the right bus slave 204b and the right coherency filter 200b. The I/O FIFO memory 506c outputs to the I/O bus slave 204c and the I/O coherency filter 200c. When one of the bus slaves 204 or one of the coherency filters 200 desires to send a bus transaction to another bus, they obtain one of the address cell identifiers from their assigned FIFO memory 506.

Thus, the preferred buffer manager 210 provides a pool of address cells 500 which interconnect all the buses 102, 104 and 106. Providing such a pool of address cells 500 rather than separate bus paths reduces system complexity. Furthermore, the address cell priority encoders 504 and the FIFO memories 506 ensure that the free address cells 500 are evenly distributed among the buses 102, 104 and 106.

In another aspect of the present invention as illustrated in FIG. 5B, the preferred buffer manager 210 contains a plurality of address comparators 510 which identify address conflicts. Typically, address conflicts arise when two different bus transactions relate to the same data value and occur at about the same time. In such situations, it is possible that two address cells 500 will contains the same memory address 504 for two different bus transactions in the address cells 500. In such situations, improper bus transactions can occur.

When one the bus slaves 204 receives a bus transaction, the bus slave 204 forwards the address associated with the bus transaction to the address comparators 510 assigned to the same bus as the bus slave 204. The address comparators 510 compare the new memory address 504 with all of the memory addresses 504 existing in the in-use address cells 500. If the same memory address is detected in the in-use address cells 500, the address comparators 510 produce an output which notifies the bus slaves 204 that an address conflict exists. The bus slaves 204 then sends a retry signal to the processor 112 which initiated the bus transaction which created the address conflict. The processor 112 then initiates the bus transaction at a later date.

In the preferred embodiment, a set of address comparators 510 is assigned to each bus. Thus, the left set of address comparators 510a are assigned to the left bus 102. The right set of address comparators 510c are assigned to the right bus 104 and the I/O set of address comparators 510a are assigned to the I/O bus 106. When the bus slaves 204 receive a new memory address 504 the bus slaves 204 forward the new memory address 504 to the address comparators 510. The address comparators 501 then evaluate the memory addresses 504 existing in the in-use address cells 500 to determine whether an address conflict exists.

For example, the right bus slave 202b may receive an I/O transaction which is directed to one of the I/O bridges 120 on the I/O bus 106. Upon receiving the memory address associated with the I/O transaction, the right bus slave 202b forwards the memory address to the right address comparators 510c. The right address comparators 510c compare the memory address with the existing memory addresses 504 in the in-use address cells 500. If a copy of the memory address exists in the in-use address cells 500, the address comparators send a signal back to the right bus slave 202b that an address conflict exists. In this example, the right bus slave 202b directs the processor 112c or 112d to retry the I/O transaction at a later date.

When it is necessary to perform an invalidation bus transaction which invalidates an entry in one of the tag memories 212, is desirable to delay the invalidation operation until a later date when the bus may not be busy. One approach is to store the old cache line address (the cache line address which will be invalidated) in the buffer manager. In the preferred embodiment, the address cells 500 in the buffer manager 210 includes the entire memory address of a cache line which includes the tag page address 402 and the offset address 404 associated with a cache line. Adding the old cache line address to one of the address cells 500 allows the multiple-bus system 100 to proceed with a new bus transaction even though the old cache line address has not actually been invalidated.

Assuming another bus transaction relates to the old cache line address 400 existing in the buffer manager 210, when the bus transaction is received by one of the bus slaves 204, the bus slave 204 forwards the address associated with the bus transaction to the address comparators 510. The address comparators 510 compare the offset address 404 associated with the bus transaction with the offset address 404 of the old cache line address. If any address conflicts exist, the comparators evaluate the data cell status bits 505. If the data cell status bits 505 indicate that the old cache line address needs to be invalidated, the new bus transaction is forced to retry until the old cache line address 400 can be invalidated. An alternative embodiment to this approach is discussed below in the section entitled "Other Embodiments."

C. The Central Request List

Figure 6:
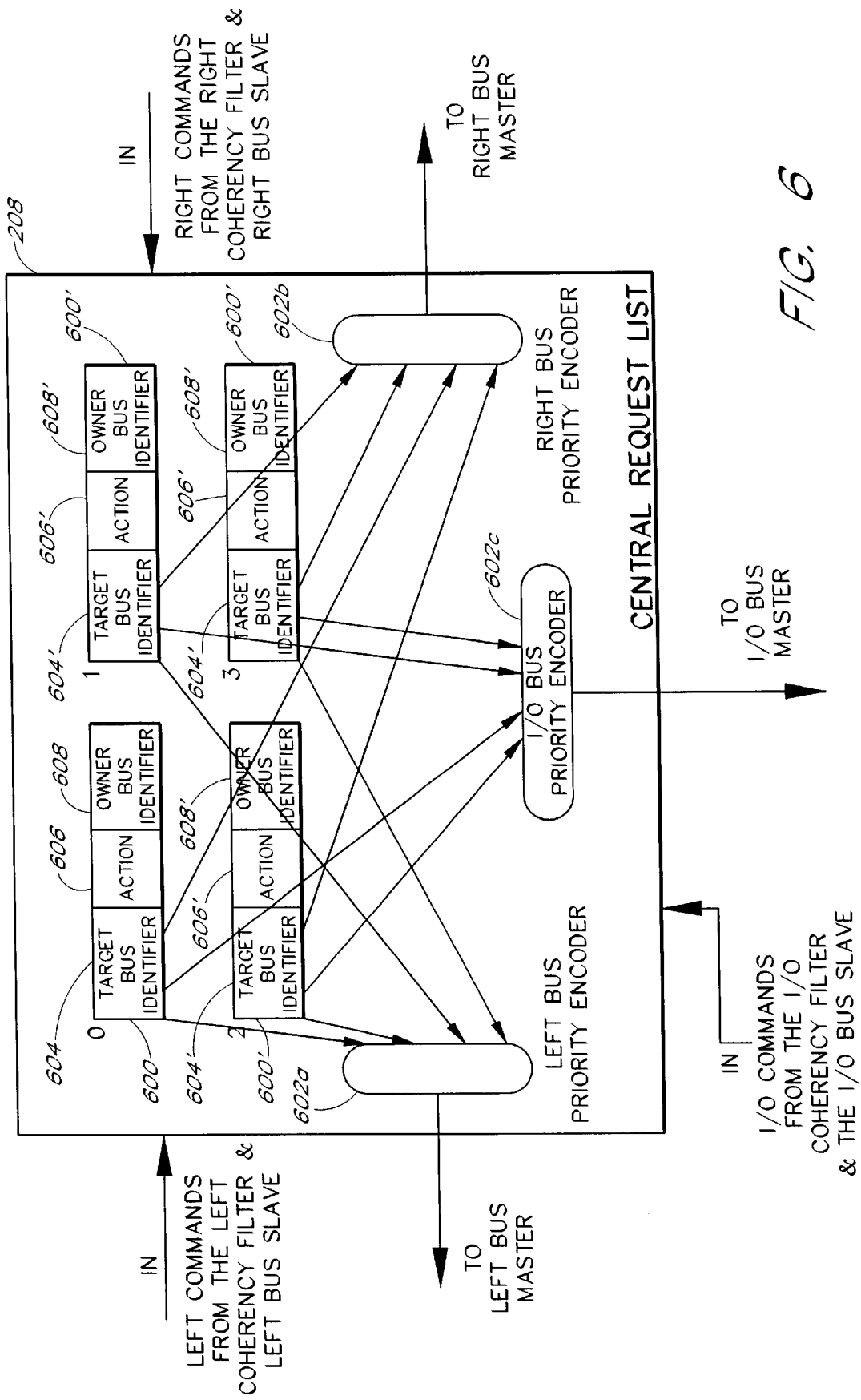
FIG. 6 is a block diagram of a preferred central request list.

Focusing now on the preferred central request list 208 illustrated in FIG. 6, the central request list 208 contains a pool of request cells 600, a left bus priority encoder 602a, a right bus priority encoder 602b and an I/O bus priority encoder 602c. Each request cell 600 is multiported and in communication with each of the address cell priority encoders 602. In the preferred central request list 208, there are 64 request cells 600. Furthermore, a one-to-one correspondence exists between the 64 address cells 500 and the 64 request cells 600.

Each request cell 600 contains a target bus identifier 604, a bus transaction code 606 and an owner bus identifier 608. The target bus identifier 604 identifies a destination bus 102, 104 or 106. As discussed in more detail below, the bus identifiers 604 are not predefined, rather the preferred embodiment sets the bus identifiers 604 as needed to identify either the right bus 102, the left bus 104 or the I/O bus 106. For example, the target bus identifier 604 may designate that the bus transaction code 606 is for the right bus 104. The bus transaction code, on the other hand, identifies the type of bus transaction to perform on the destination bus. In the preferred embodiment, the bus masters 202 perform the bus transactions identified by the bus transaction codes 606. The owner bus identifier 608 identifies the originating bus. For example, the owner bus identifier 604 may indicate that the bus transaction code 606 originated on the left bus 102.

The bus priority encoders evaluate the target bus identifiers 604 in each of the request cells 600 to determine which request cells designate different buses. The bus master 202 associated with one of the buses 102, 104 or 106 then performs the bus transaction identified in a particular request cell 600. For example, the left bus priority encoder 602a evaluates all the target bus identifiers 604 to identify which request cells 600 are for the left bus 102. The right bus priority encoder 602b evaluates all the target bus identifiers 604 to identify which request cells 600 are for the right bus 104. The I/O bus priority encoder 602c evaluates all the target bus identifiers 604 to identify which request cells 600 are for the I/O bus 106.

In addition to identifying the destination buses 102, 104 and 106, each bus priority encoder 602 also determines which of the bus request cells 500 associated with a particular bus 102, 104 or 106 has the highest priority. In the preferred embodiment, each bus priority encoder 602 determines the highest priority request cell 600 by using round robin logic. Once each bus priority encoder 602 forwards the highest priority request cell 600 to its assigned bus, each bus priority encoder 602 rotates the assignment of priorities for each request cell 600. The round robin logic ensures that each bus priority encoder 602 sequentially assigns the highest priority to all the bus request cells 600. Such round robin logic is known by those of ordinary skill in the art.

For example, assume that the right bus priority encoder 602b has identified that two of the request cells 600 are for the right bus 104. The right bus priority encoder 602b assigns the first request cell 600 the highest priority and directs the first request cell identifier to the right bus master 202b. The right bus priority encoder 602b then assigns the second request cell 600 the highest priority and directs the second request cell identifier to the right bus master 202b. When the right bus priority encoder 602b reaches the end of the request cells 600 assigned to the right bus 104, the right bus priority encoder returns to the beginning of the pool of request cells 500.

Thus, the central request list 208 provides a pool of request cells 600 which interconnect to all of the buses 102, 104 and 106. Such a pool of request cells 600, when contrasted to separate bus connection paths, reduce system complexity. Furthermore, the bus priority encoders 602 in the central request list 208 ensure that each of the bus transaction in the request cells are performed by the buses 102, 104 and 106.

IV. The Data Interface Buffer

Figure 7:
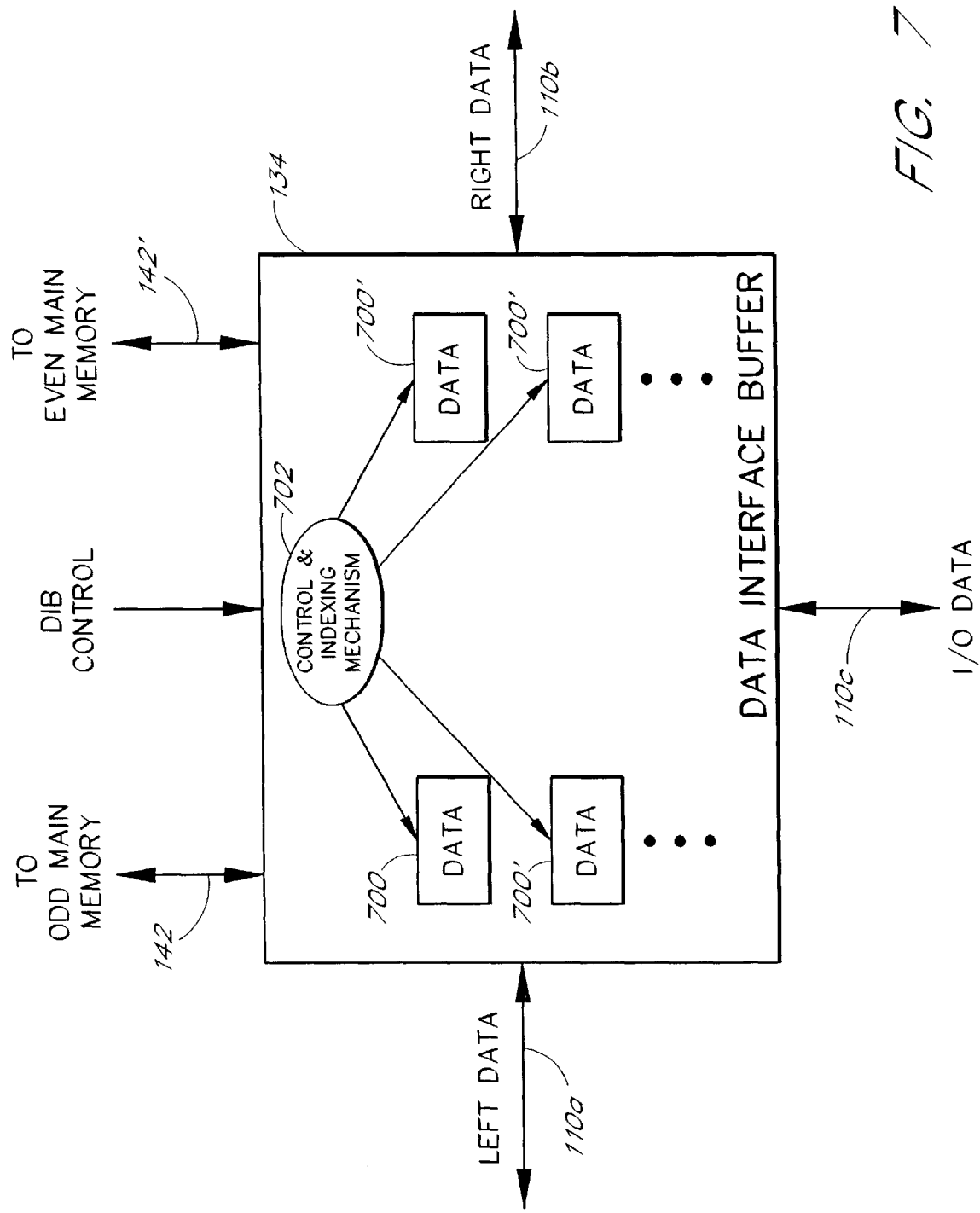
FIG. 7 is a block diagram of the preferred data interface buffer.

Focusing now on the preferred data interface buffer 134 as illustrated in FIG. 7, the data interface buffer 134 contains a pool of data cells 700, and a control and indexing mechanism 702. Each request cell 600 is multiported and in communication with the data lines 110a, 110b, and 110c and the data lines 142a and 142b connected to the odd main memory module 132a and even main memory module 132b. In the preferred central request list 208 there are 64 data cells 700. Furthermore, a one-to-one correspondence exists between the 64 data cells 700, the 64 request cells 600 and the 64 address cells 500. Each data cell 700 contains a data value associated with a bus transaction.

The control and indexing mechanism 702 receives the DIB control lines 140 from the bus slaves 204. The DIB control lines 140 identify a particular data cell 700 and one of the buses 102, 104 or 106. For example, when the I/O bus slave 204 adds a new bus transaction to one of the address cells 500 and one of the request cells 600, the I/O bus slave 204 also adds the data associated with the new bus transaction to the corresponding data cell 700. In this example, the I/O bus slave 204 asserts the DIB control lines to identify the proper data cell 700. The control and indexing mechanism 702 then enables the proper data cell 700 to receive data from the I/O data lines 110c.

Thus, the data interface buffer provides a pool of data cells 700 which are accessible by all the buses 102, 104 or 106. Providing such a pool of data cells 700 rather than separate bus interconnections, reduces system complexity and improves performance.

V. Maintaining Cache Coherency

The bus transactions monitored by the coherency filters 200 includes a Bus Read Line command and a Bus Read Invalidate command. The Bus Read Line (BRL) command reads and invalidates a cache line of instruction code or data from the main memory 132. The Bus Read Invalidate Line (BRIL) command invalidates a cache line. While the preferred rules tables 304 are adapted for these bus commands, one of ordinary skill in the art will recognize that the rules tables 304 can be adapted for many different bus commands and thus, are not limited to the bus commands of the preferred embodiment.

A. Processing The Bus Read Line Command

Figure 8:
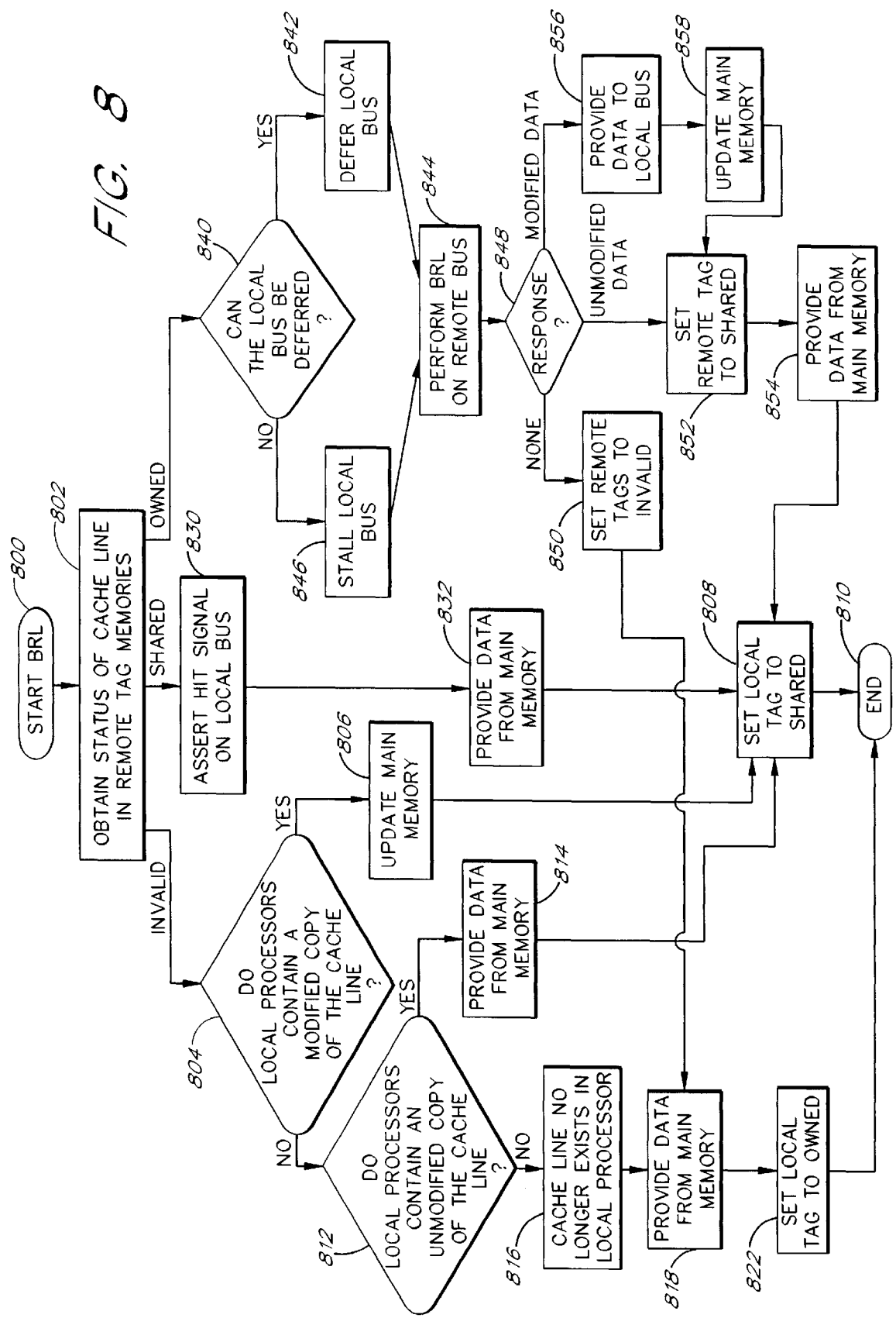
FIG. 8 is a flow chart illustrating the preferred method of maintaining memory coherency during a Bus Read command.

FIG. 8 illustrates a flow chart for maintaining cache coherency when one of the buses 102, 104, or 106 executes a Bus Read Line (BRL) command. Beginning in a start block 800, one of the processors 112 executes the BRL command. During execution of the BRL command, the processor 112 sends the cache line address 400 of the desired cache line to its assigned coherency filter 200 and bus slave 204.

When the bus slave 204 receives the cache line address, the bus slave 204 forwards the cache line address to the address comparators 510 assigned to the same bus. The address comparators 510 compare the offset address 404 with the offset portion of the memory addresses 504 existing in the in-use address cells 500 to determine whether any address conflicts may exist. The address comparators 510 also evaluate the data cell status bits 505 to see if the address cell 500 which generates an address conflict relates to an invalidation transaction. If so, the address comparators 510 send an address conflict signal to the bus slave 204. The bus slave 204 then directs the requesting processor 112a to retry the BRL command at a later time.

If the address comparators do not indicate that an address conflict exists, the preferred embodiment proceeds to block 802, the cycle encoder 302 determines that the bus 102, 104 or 106 is performing a BRL command. Also, the tag controller 300 assigned to the bus 102, 104 or 106 uses the cache line address 400 identified in the BRL command to access the cache line addresses 400 in the tag memories 212 assigned to the other buses 102, 104 and 106 (the remote tag memories 212). The remote tag memories 212 return the remote coherency status bits 412 which indicate whether the remote cache line addresses 400 are in the invalid state, the shared state or the owned state.

Only one remote tag memory 212 may contain a particular cache line address in the owned state. However, more than one remote tag memory 212 may contain a particular cache line address in the shared or invalid states. If one remote tag memory 212 contains a copy of cache line address in the shared state while another remote tag memory 300 contains a copy of the same cache line address in the invalid state, the coherency status bits 412 in the shared state take precedence. As discussed in more detail below, if more than one remote tag memory 300 contains a copy of a particular cache line address in the shared state, the coherency rules 304 may perform a remote bus transaction on more than one remote bus 102, 104 or 106 to ensure cache coherency. In addition, if none of the remote tag memories 300 contain a particular cache line address 400, the remote coherency status bits 412 associated with the cache line addresses 400 are treated as if they are in the invalid state.

For example, when the first processor 112a on the left bus 102 generates a BRL command for a particular cache line address 400 in block 802, the left cycle encoder 302a determines that the left bus is performing a BRL command. Also, the left tag controller 300 uses the cache line address 400 to accesses the remote right tag memory 212b and the remote I/O tag memory 212c. The tag controller 300 obtains from the right tag memory 212b and the I/O tag memory 212c, the remote coherency status bits 412 which indicate whether the cache line addresses 400 in the right tag memory 212b and the I/O tag memory 212c are in the invalid state, the shared state or the owned state. If neither the right tag memory 212b nor the I/O tag memory 212c contain the cache line address 400, the left tag controller 300a threats the remote coherency status bits 412 as if they are in the invalid state.

Focusing now on the operation of the preferred rules table 304 while using the local and remote designations, the cycle encoder 302 associated with the local bus 102, 104 or 106 sends the local rules table 304 the type of bus transaction (the BRL command) and the state of the remote cache status bits 412. If the remote coherency status bits 412 indicate that the remote cache line address 400 is in the invalid state, the local rules table 304 proceeds to block 804. In the preferred embodiment, if the remote coherency status bits 412 are in the invalid state, the local rules table 304 does not generate a BRL cross-bus transaction on any of the remote buses 102, 104 or 106. Rather, the local rules table 304 maintains the superset of cache line addresses 400 in the local tag memory 300.

Proceeding to block 804, the local processors 112 interrogate their internal cache memories 114 in order to determine whether any of the local processors 112 contain a copy of the desire cache line. In the preferred embodiment, one of the processors 112 also asserts a HITM# signal when a bus snoop operation indicates that a modified cache line exists in the processor's cache memory 114. The HITM# signal is one of the address and control lines 108 and indicates that the processor 112 with the up-to-date cache line needs to write the cache line back to main memory 132.

In block 806, the local processor 112 with the modified cache line responds to the bus transaction and simultaneously updates main memory 132 by writing the modified cache line back to the main memory 132. Proceeding to block 808, the local rules table 304 directs the local tag controller 300 to set the coherency status bits 412 in the local tag memory 212 to the shared state. The local rules table 304 then proceeds to an end block 810.

Returning to block 804, if the local processors 112 do not contain a modified copy of the cache line, the rules table 304 proceeds to block 812. In block 812, the local rules table 304 evaluates the HIT# signal on the local bus 102, 104 or 106. As explained above, the local processors 112 generate the HIT# signal when the local processors 112 contain an unmodified copy of the cache line in their cache memories 114. If the local processors 112 do contain an unmodified copy of the cache line, the local rules table 304 proceeds to block 814.

In block 814, the local bus slave 204 obtains the cache line from the main memory 132. If the cache line address is odd, the local bus slave 204 obtains the cache line from the odd main memory 132a. If the cache line address is even, the local bus slave 204 obtains the cache line from the even main memory module 132b. The local bus slave 204 then sends the cache line to the requesting processor 112.

Proceeding to block 808, the local rules table 304 directs the local tag controller 300 to set the coherency status bits 412 in the local tag memory 300 to the shared state. The local rules table 304 then proceeds to the end block 810.

Returning to block 812, if the local processors 112 do not assert the HIT# signal or the HITM# signal, the cache line no longer exists in the local processors 112 as represented by block 816. Proceeding to block 818, if the local tag memory 212 does not have a copy of the cache line address 400, the rules table 304 adds the cache line address 400 to the local tag memory 212. As discussed above, the local tag memory may need to expel an existing cache line address from the local tag memory to make room for the new cache line address. If so, the old cache line address is first invalidated before the new cache line address is added to the local tag memory. The left bus slave then obtains the desired cache line from the main memory 132 and sends it to the requesting processor 112.

The local rules table 304 proceeds to block 822 and directs the local tag controller 300 to set the cache line's coherency status bits 412 in the local tag memory 212 to the owned state. However, if one of the local processors 112 on the local bus asserts the HIT# signal, the local tag memory 212 is set to shared. In addition, if the BRL command is for code and the remote status is not owned, then the rules table 304 asserts the HIT# signal. If no HITM# is then detected, the processor which initiated the BRL command will mark its internal cache status as shared. If the HITM# signal is asserted, then an implicit write back is performed and the local tag memory 212 is set to shared. The local rules table 304 the proceeds to the end block 810.

Returning now to block 802, the following discussion focuses on what occurs when the remote tag memories 300 indicate that the remote cache line addresses 400 are in the shared state. When the remote coherency status bits 412 indicate that the cache line address 400 is in the shared state, the local rules table 304 does not generate a BRL cross-bus transaction on the remote buses 102, 104 or 106. Rather, the local rules table 304 obtains the desired cache line from main memory 132 and updates the local tag memory 300.

Proceeding to block 830, for code reads, the local rules table 304 asserts the HIT# signal on the local bus 102, 104 or 106. The local rules table 304 then proceeds to block 832. In block 832, the local rules table 304 obtains the desired cache line from the main memory 132. If the desired cache line address does not exist in the local tag memory 212, the tag controller adds the new cache line address 400 to the local tag memory 212. As discussed above, the tag controller 300 may expel one of the older cache line addresses 400 to make room for the new cache line address 400.

Proceeding to sate 808, the local rules table 304 sets the cache line's coherency status bits 412 to shared and proceeds to the end block 610.

Returning now to block 802, the following discussion focuses on what occurs when one of the remote tag memories 212 indicate that one of the remote cache line addresses 400 is in the owned state. If the remote coherency status bits 412 indicate that one of the remote cache line address 400 is in the owned state, the remote bus has the up-to-date version of the desired cache line and thus, the up-to-date cache line must be obtained from the remote bus. In block 802, the rules table 304 generates the BRL cross-bus transactions necessary to ensure cache coherency. In the preferred Invalid, Shared and Owned protocol, only one bus can own the cache line at any given point in time. Thus, the remote cache line must be changed to a different coherency state.

Proceeding to block 840 the local rules table 304 determines whether the local BRL command can be deferred. Deferring the local BRL command allows the local bus to continue transmitting bus transactions. As explained above, the processor 104 which issues the bus transaction indicates whether the bus transaction is deferrable by asserting its DEN# signal. If the DEN# signal is asserted, the local rules table 304 proceeds to block 842 and directs the local bus slave 204 to defer the local BRL command. Proceeding to block 844, the local rules table 304 then directs the present invention to perform a BRL command on one of the remote buses 102, 104 or 106.

Returning to block 840, if the bus transaction cannot be deferred, the local rules table 304 proceeds to block 846 and directs the local bus slave 204 to stall the local BRL command. Proceeding to block 844, the local rules table 304 then directs the present invention to perform a BRL command on one of the remote buses 102, 104 or 106.

In block 844, the buffer manager 210 and the central request list 208 transfer the BRL command to the desired bus. For example, assume that the first processor 112a in the left bus 102 executes a BRL command for a particular cache line address. Furthermore, assume that the right bus coherency status bits 412 for the cache line address 400 indicate that the cache line address 400 is in the owned state.

In this example, the left rules table 304a determines that a BRL command on the right bus 104 is necessary to ensure cache coherency. The left rules table 304a then obtains a free address cell identifier from the left FIFO 506a. The left rules table 304a accesses the address cell 506a identified by the address cell identifier and enters the cache line address 400 into the memory address 504. In addition, the left rules table 304a accesses the corresponding request cell 600 and stores the right bus identifier in the target bus identifier 604, the BRL command in the bus transaction code 606 and the left bus identifier in the owner bus identifier 608.

Once the right bus priority encoder 602b assigns the highest priority to the request cell 600, the right bus master 202b performs the BRL command on the right bus 104. Proceeding to block 848, the right processors respond to the BRL command on the right bus 104. In block 848, the right processors evaluate the status of the cache line addresses in their cache memories 114. If the right processors no longer have a copy of the desired cache line address, the right processors do not assert the HIT# and HITM# signals.

Proceeding to block 850, the right tag controller 300b sets the coherency status bits 412 in the right tag memory 212b to the invalid state. If the local bus transaction was deferred, the left bus slave 202a issues a deferred reply transaction on the left bus 102. Proceeding to block 818, the left bus slave 202a obtains the desired cache line from the main memory 132 and sends it to the requesting processor 112 on the left bus 102. The left rules table 304a then proceeds through blocks 822 or 824 and reaches end block 810 as discussed above.

Returning now to block 848, if the right processors 112c or 112d contain an unmodified copy of the cache line, they assert the right HIT# signal and the present invention proceeds to block 852. In block 852, the right tag controller 300b sets the coherency status bits 412 in the right tag memory 212b to the shared state.

Proceeding to block 854, if the left tag memory 212b does not have a copy of the cache line address 400, the left rules table 304 directs the left tag controller 300a to add the cache line address 400 to the left tag memory 212a. As discussed above, the local tag memory may need to expel an existing cache line address 400 from the left tag memory to make room for the new cache line address. If so, the old cache line address is first invalidated before the new cache line address is added to the left tag memory.

While in block 852, the left bus slave obtains the desired cache line from the main memory 132 and sends it to the requesting processor 112a on the left bus 102. Proceeding to block 808, the left rules table 304a directs the left tag controller 300a to set the coherency status bits 412 in the left tag memory 212a to shared and proceeds to the end block 810.

Returning now to block 848, if one of the right processors 112c or 112d have a modified copy of the cache line in its cache memory 114, the right processor 112c or 112d asserts the right HITM# signal. Proceeding to block 856, the modified cache line is provided to the left bus 102. In particular, the modified cache line is loaded into the corresponding data cell 700 in the data interface buffer 134 and is then sent to the left bus 102 which is identified in the owner bus identifier 608. The data cell 700 is then accessed by the left bus slave 204a which transmits the modified cache line (with a deferred response if the original bus transaction was deferrable) to the left bus 102. In addition, the right tag controller 300b sets the coherency status bits in the right tag memory to the shared state.

Proceeding to state 858, as part of the response, the modified cache line is written back to the main memory 132. The present invention then proceeds to block 852, 854, block 808 and end block 810 as discussed above. Thus, the present invention performs a BRL cross-bus transaction when it is probably necessary to maintain cache coherency. While the above example discusses the process when the left bus 102 initiates a BRL command, the similar process occurs when the right bus 104 or the I/O bus 106 initiates a BRL command.

B. Processing The Bus Read Invalidate Line Command

Figure 9:
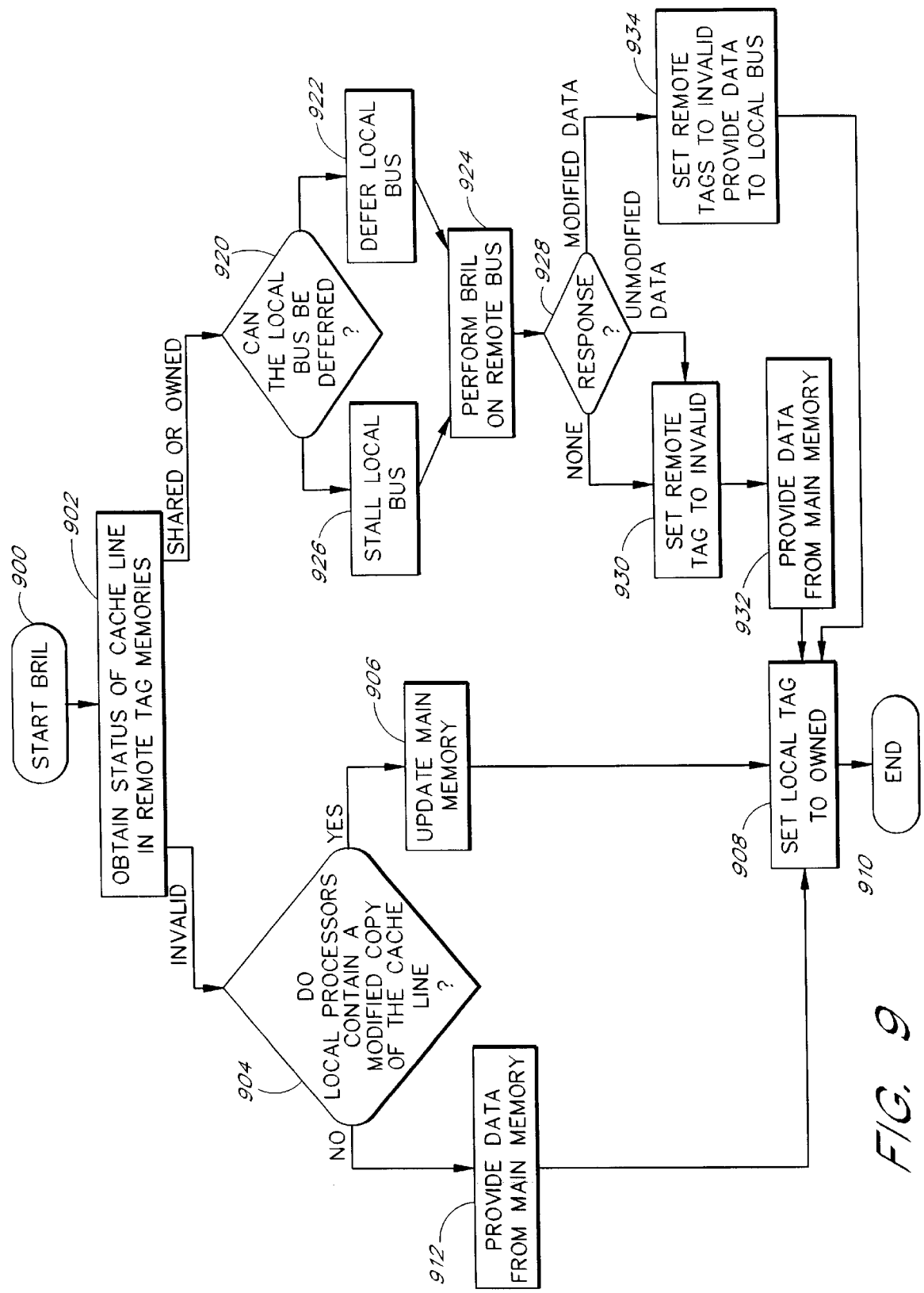
FIG. 9 is a flow chart illustrating the preferred method of maintaining memory coherency during a Bus Invalidate command.

FIG. 9 illustrates a flow chart for maintaining cache coherency when one of the buses 102, 104, or 106 executes a Bus Read Invalidate Line (BRIL) command. Beginning in a start block 900, one of the processors 112 executes the BRIL command. During execution of the BRIL command, one of the processors 112 sends the desired cache line address 400 to its assigned coherency filter 200.

Proceeding to block 902, the cycle encoder 302 determines that the bus 102, 104 or 106 is performing a BRIL command. Also, the assigned tag controller 300 uses the cache line address 400 identified in the BRIL command to access the cache line addresses 400 in the remote tag memories 212. If the remote tag memories 212 contain the cache line address 400, they return the remote coherency status bits 412 which indicate that the remote cache line addresses 400 are in the invalid state, the shared state or the owned state.

As explained above, only one remote tag memory 212 may contain a particular cache line address in the owned state. However, more than one remote tag memory 212 may contain a particular cache line address in the shared or invalid states. If one remote tag memory 212 contains a copy of cache line address in the shared state while another remote tag memory 300 contains a copy of the same cache line address in the invalid state, the coherency status bits 412 in the shared state take precedence. As discussed in more detail below, if more than one remote tag memory 300 contains a copy of a particular cache line address in the shared state, the coherency rules 304 may perform a remote bus transaction on more than one remote bus 102, 104 or 106 to ensure cache coherency. In addition, if none of the remote tag memories 300 contain a particular cache line address 400, the remote coherency status bits 412 associated with the cache line addresses 400 are treated as if they are in the invalid state.

For example, when the processors 112a on the left bus 102 generates a BRIL command for a particular cache line address 400 in block 902, the left cycle encoder 302a determines that the left bus 102 is performing a BRIL command. Also, the left tag controller 300a uses the cache line address 400 to accesses the right tag memory 212b and the I/O tag memory 212c. The tag controller 300 obtains from the right tag memory 212b and the I/O tag memory 212c, the remote coherency status bits 412 which indicate whether the cache line addresses 400 in the right tag memory 212b and the I/O tag memory 212c are in the invalid state, the shared state or the owned state. If neither the right tag memory 212b nor the I/O tag memory 212c contain the cache line address 400, the left tag controller 300a threats the remote coherency status bits 412 as if they are in the invalid state.

Focusing now on the operation of the preferred rules table 304 and using the local and remote designations, the cycle encoder 302 associated with the local bus 102, 104 or 106 sends to the local rules table 304 the type of bus transaction (the BRIL command) and the state of the remote coherency status bits 412. If the remote coherency status bits 412 indicate that the remote cache line address 400 is in the invalid state, the local rules table 304 proceeds to block 904. In the preferred embodiment, if the remote coherency status bits 412 are in the invalid state, the local rules table 304 does not generate a BRIL cross-bus transaction on any of the remote buses 102, 104 or 106. Rather, the local rules table 304 maintains the superset of cache line addresses 400 in the local tag memory 300.

Proceeding to block 904, the local processors 112 interrogate their internal cache memories 114 in order to determine whether any of the local processors 112 contain a copy of the desire cache line. In the preferred embodiment, one of the processors 112 also asserts a HITM# signal when a bus snoop operation indicates that a modified cache line exists in the processor's cache memory 114. The HITM# signal is one of the address and control lines 108 and indicates that the processor 112 with the up-to-date cache line needs to write the cache line back to main memory 132.

In block 906, the local processor 112 responds to the bus transaction and simultaneously updates main memory 132 by writing the modified cache line back to the main memory 132. Proceeding to block 908, the local rules table 304 directs the local tag controller 300 to set the coherency status bits 412 in the local tag memory 212 to the owned state. The local rules table 304 then proceeds to an end block 910.

Returning to block 904, if the local processors 112 do not contain a modified copy of the cache line, the local rules table 304 proceeds to block 912. As explained above, if the local tag memory 212 does not have a copy of the cache line address 400, the local rules table 304 adds the cache line address 400 to the local tag memory 304. Thus, the local tag memory may need to expel an existing cache line address from the local tag memory to make room for the new cache line address. If so, the old cache line address is first invalidated before the new cache line address is added to the local tag memory. While in block 912, the left bus slave also obtains the desired cache line from the main memory 132 and sends it to the requesting processor 112.

Returning now to block 902, the following discussion focuses on what occurs when the remote tag memories 300 indicate that the remote cache line addresses 400 are in the shared or owned state. When the remote coherency status bits 412 indicate that the remote cache line addresses 400 are in the shared or owned state, the local rules table 304 generates the BRIL cross-bus transaction necessary to ensure cache coherency.

Proceeding to block 920, the local rules table 304 determines whether the local BRIL command can be deferred. As explained above, the processor 104 which issues the bus transaction indicates whether the bus transaction is deferrable by asserting its DEN# signal. If the DEN# signal is asserted, the local rules table 304 proceeds to block 922 and directs the local bus slave 204 to defer the local BRIL command. Proceeding to block 924, the local rules table 304 then directs the present invention to perform a BRIL command on one of the remote buses 102, 104 or 106.

Returning to block 920, if the bus transaction cannot be deferred, the local rules table 304 proceeds to block 926 and directs the local bus slave 204 to stall the local BRIL command. Proceeding to block 924, the local rules table 304 then directs the present invention to perform a remote BRIL command on one of the remote buses 102, 104 or 106.

In block 924, as explained above with respect to block 844, the buffer manager 210 and the central request list 208 transfer the BRIL command to the desired remote bus 102, 104 or 105. Proceeding to block 928, the BRIL command is executed on the remote buses 102, 104 and 106. In block 928, the remote processors evaluate the status of the cache line addresses in their cache memories 114. If the remote processors no longer have a copy of the desired cache line address 400, the right processors do not assert the HIT# or HITM# signals.

Proceeding to block 930, the remote tag controller 300 sets the coherency status bits 412 in the remote tag memory 212 to the invalid state. Proceeding to block 932, the left bus slave obtains the desired cache line from the main memory 132 and sends it to the requesting processor 112 on the left bus 102. Furthermore, if the cache line address 400 does not exist in the local tag memory 212, the local rules table 304 directs the local tag controller 300 to add the new cache line address 400 to the local tag memory. As discussed above, this may require that the invalidation of an existing cache line address. Proceeding to block 908, local tag controller 300 sets the coherency status bits in the local tag memory 212 to owned and then proceeds to end block 910.

Returning now to block 928, if the remote processors 112 contain an unmodified copy of the cache line, they assert the remote HIT# signal and the present invention proceeds to block 930, block 932, block 908 and end block 910 as discussed above. Returning again to block 928, if one of the remote processors 112 have a modified copy of the cache line in its cache memory 114, the remote processor 112 asserts the remote HITM# signal.

Proceeding to block 934, the modified cache line is provided to the local bus 102, 104 or 106. In particular, the modified cache line is loaded into the appropriate data cell 700 in the data interface buffer 134 and sent back to the bus identified in the owner bus identifier 608. The local bus slave 204 then transmits the modified cache line (with a deferred response if the original bus transaction was deferrable) on local left bus 102. In addition, the remote tag controller 300 sets the remote coherency status bits in the remote tag memory to the invalid state. As part of the response, the modified cache line is written back to the main memory 132.

The present invention then proceeds to block 908, and end block 910 as discussed above. Thus, the present invention performs a BRIL cross-bus transaction when it is probably necessary to maintain cache coherency.

VI. Other Embodiments

Figure 10:
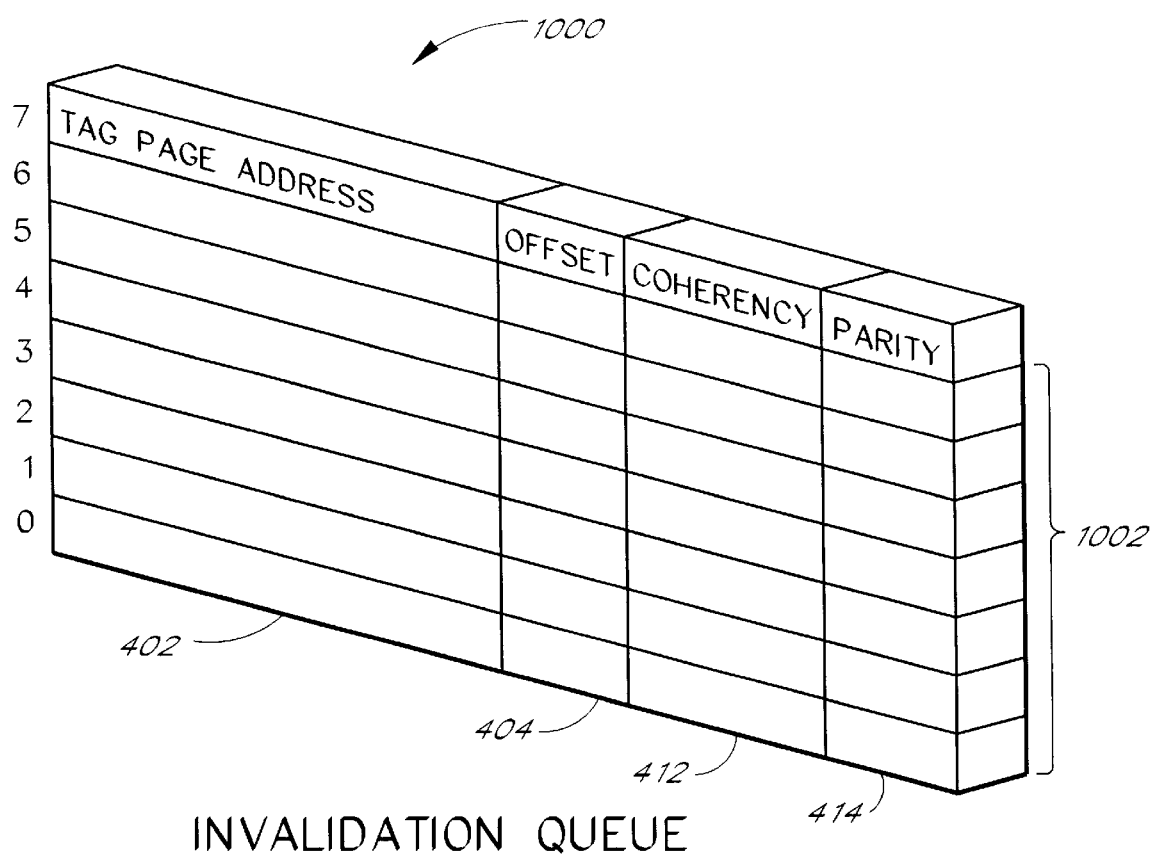
FIG. 10 is a block diagram of an invalidation queue in another embodiment of the present invention.

Another embodiment of the present invention implements contains what is called an invalidation queue. Focusing now on the invalidation queue 1000 illustrated in FIG. 10, each bus has an assigned invalidation queue 1000. The invalidation queue 1000 contains a relatively small number of queue entries 1002. Each queue entry 1002 stores the tag page address 402, the offset address 404, the coherency status bits 412 and the parity bit 414 for one of the cache line addresses 400.

In the preferred embodiment, the preferred tag memory 212 is smaller than the main memory 132. Thus, at times, more than one cache line address 400 will map to the same tag entry 410. When a cache line maps to an occupied tag entry 410, the tag controllers 300 must expel the occupied tag entry 410 from the tag memory 212. That is, the existing cache line in the occupied tag entry 410 must be invalidated so that the tag controller 300 can store the new cache line address 400 in the tag entry 410.

In addition, when two processors 112 attempt to access two cache lines which map to the same tag entry 410, the coherency filters 200 will invalidate the first cache line address 400 and replace it with the second cache line address 400. The coherency filters 200 will then invalidate the second cache line address 400 and replace it with the first cache line address 400. This ping-pong effect is called tag memory thrashing. While it is possible to minimize tag memory thrashing with a larger tag memory 212, this approach can significantly increase the cost of the tag memory 212. Advantageously, the invalidation queues 1000, significantly reduces tag memory thrashing while minimizing additional memory costs.

Furthermore, when an old cache line address must be invalidated, the bus transaction associated with the new cache line address must be delayed until completion of the old cache line invalidation. The preferred invalidation queue 100 allows the new bus transaction to proceed. The old cache line address can then be invalidated at a later time when the bus might be free.

When one of the coherency filters 200 needs to expel a tag entry 410 from its tag memory 212, the tag entry 410 is stored in the coherency filter's invalidation queue 1002. While the preferred invalidation queue 1000 stores up to eight expelled tag entries 410, the invalidation queue 1002 can contain a wide number of expelled tag entries 410. When one of the coherency filters 200 expels more than eight tag entries 410, the invalidation queue 1000 keeps the most recently accessed tag entries 410 and invalidates the flushed tag entries 410.

The invalidation queues 1000 store the queue entries 1002 in a different format than the tag entries 410 in the tag memories 212. In particular, the preferred queue entry 1002 contains the tag page address 402, the offset address 404, the coherency status bits 412 and the parity bit 414 of a tag entry 410 expelled from the tag memories 212. Because any cache line address 400 can exist in any queue entry 1002, each invalidation queue 1000 is said to be fully associative.

Because each invalidation queue 1000 contains a relatively small number of invalidation queue entries 1002, each invalidation queue 1000 provides a low cost alternative to increasing the size of the tag memories 212. In the preferred embodiment, the invalidation queues 1000 are implemented with a static random access memory existing in the system access controller 130.

VII. Conclusion

While a preferred embodiment of the invention has been described, these embodiments have been presented by way of example only, and are not intended to limit the scope of the present invention. For example, although the invention is described herein with reference to a three-bus system 100, the invention could contain more buses. Furthermore, the invention could be implemented on a wide variety of multiprocessing systems. Accordingly, the breath and scope of the invention should be defined in accordance with the following claims and their equivalents.

What is claimed is:

1. A coherency filter comprising:

a cycle encoder coupled to a set of tag controllers and to a rules table, the cycle encoder to determine a bus transaction type;

a tag memory array coupled to the cycle encoder, the tag memory array to record a coherency status of data values existing in a plurality of processors coupled to multiple buses; and an invalidation queue coupled to the cycle encoder and to the tag memory array, the invalidation queue to store entries which are expelled from the tag memory array;

wherein the cycle encoder monitors transactions on a first bus and selectively inhibits cross-bus transactions to a second bus based on transaction type and corresponding rules retrieved from the rules table.

2. The coherency filter of claim 1, wherein the set of tag controllers comprises a control logic for direct mapping a cache line address into the tag memory array.

3. The coherency filter of claim 1, wherein the coherency status is maintained according to the MESI cache coherency protocol.

4. The coherency filter of claim 1, wherein the coherency status is maintained according to the MOESI cache coherency protocol.

5. The coherency filter of claim 1, wherein the rules table comprises:

a control logic to evaluate the bus transaction type information and remote coherency status bits obtained from the cycle encoder, the control logic further to perform snoop actions; and a memory coupled to the control logic, the memory to store a truth table to maintain types of cross-bus transactions and local bus transactions to be executed to ensure cache coherency.

6. A method comprising:

monitoring transactions on a first bus which access a cache line in a main memory;

storing an address corresponding to the cache line;

determining a bus transaction type;

recording a coherency status of the cache line;

determining whether a cross-bus transaction to a second bus is necessary, based at least in part on a type of bus transaction and coherency status data;

expelling a cache line address when the cross-bus transaction is necessary; and storing an expelled cache line.

7. The method of claim 6, wherein the coherency status comprises a status of the cache line in a cache memory of at least one processor.

8. The method of claim 6, wherein the coherency status is maintained according to the MESI cache coherency protocol.

9. The method of claim 6, wherein the coherency status is maintained according to the MOESI cache coherency protocol.

* * * * *